(12) United States Patent
Behzadi et al.

(10) Patent No.: US 11,204,733 B2
(45) Date of Patent: Dec. 21, 2021

(54) DEVICES, METHODS, AND GRAPHICAL USER INTERFACES FOR WIRELESS PAIRING WITH PERIPHERAL DEVICES AND DISPLAYING STATUS INFORMATION CONCERNING THE PERIPHERAL DEVICES

(71) Applicant: Apple Inc., Cupertino, CA (US)

(72) Inventors: Arian Behzadi, San Francisco, CA (US); Caelan G. Stack, San Francisco, CA (US); Imran A. Chaudhri, San Francisco, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/824,506

(22) Filed: Mar. 19, 2020

(65) Prior Publication Data

US 2020/0218486 A1    Jul. 9, 2020

Related U.S. Application Data

(63) Continuation of application No. 16/056,328, filed on Aug. 6, 2018, now Pat. No. 10,628,105, which is a
(Continued)

(51) Int. Cl.
*G06F 3/14* (2006.01)
*G06F 3/0484* (2013.01)
(Continued)

(52) U.S. Cl.
CPC .............. *G06F 3/14* (2013.01); *G06F 3/0484* (2013.01); *G06F 13/128* (2013.01);
(Continued)

(58) Field of Classification Search
CPC ...... G06F 3/14; G06F 3/0484; G06F 3/04883; G06F 13/128; H04M 1/6066; Y02D 10/00
See application file for complete search history.

(56) References Cited

U.S. PATENT DOCUMENTS 9,210,498 B1    12/2015  Shaffer
9,807,491 B2    10/2017  Kim
(Continued)

FOREIGN PATENT DOCUMENTS

CN    102439972 A    5/2012
CN    104054323 A    9/2014
(Continued)

OTHER PUBLICATIONS

Samsung Electronics America, Inc., "Gear Icon X SM-R150", User Manual, https://static.bhphotovideo.com/lit_files/268655.pdf, Aug. 6, 2016, 43 pages.

(Continued)

*Primary Examiner* — Andrew T Chiusano
(74) *Attorney, Agent, or Firm* — Morgan, Lewis & Bockius LLP

(57) ABSTRACT

An electronic device having a display, radio frequency (RF) circuitry, and one or more input devices, displays a first user interface on the display. While displaying the first user interface, the electronic device detects a pairing request to pair a first peripheral with the electronic device. In response to detecting the pairing request, the electronic device pairs the first peripheral with the electronic device, and after the first peripheral is paired with the electronic device, the electronic device concurrently displays status information of the first peripheral and a second peripheral, wherein the first peripheral is coupled to the second peripheral, or the first peripheral and second peripheral are both coupled to a third peripheral.

42 Claims, 36 Drawing Sheets

Related U.S. Application Data continuation of application No. 15/271,114, filed on Sep. 20, 2016, now Pat. No. 10,042,595.

(60) Provisional application No. 62/383,976, filed on Sep. 6, 2016.

(51) Int. Cl.
*G06F 3/0488* (2013.01)
*G06F 13/12* (2006.01)
*H04M 1/60* (2006.01)

(52) U.S. Cl.
CPC ....... *H04M 1/6066* (2013.01); *G06F 3/04883* (2013.01); *Y02D 10/00* (2018.01)

(56) References Cited

U.S. PATENT DOCUMENTS

| | | | |
|---|---|---|---|
| 10,200,780 B2 * | 2/2019 | Steiner | H04R 1/1091 |
| 10,405,165 B2 * | 9/2019 | Ilami | H04B 1/3827 |
| 2003/0223604 A1 | 12/2003 | Nakagawa | |
| 2006/0135218 A1 | 6/2006 | Son et al. | |
| 2006/0166718 A1 | 7/2006 | Seshadri et al. | |
| 2006/0200358 A1 * | 9/2006 | Ohnemus | G06Q 10/06393 |
| | | | 345/619 |
| 2007/0206829 A1 | 9/2007 | Weinans et al. | |
| 2007/0300063 A1 | 12/2007 | Adams et al. | |
| 2008/0076489 A1 | 3/2008 | Rosener et al. | |
| 2008/0166968 A1 | 7/2008 | Tang et al. | |
| 2008/0226094 A1 | 9/2008 | Rutschman | |
| 2008/0248748 A1 | 10/2008 | Sangster et al. | |
| 2009/0081999 A1 | 3/2009 | Khasawneh et al. | |
| 2009/0170431 A1 * | 7/2009 | Pering | H04B 5/02 |
| | | | 455/41.1 |
| 2009/0280871 A1 | 11/2009 | Hofer et al. | |
| 2010/0041333 A1 | 2/2010 | Ungari et al. | |
| 2011/0159959 A1 | 6/2011 | Mallinson et al. | |
| 2011/0286615 A1 | 11/2011 | olodort et al. | |
| 2012/0096188 A1 | 4/2012 | Cohen et al. | |
| 2012/0144473 A1 | 6/2012 | Wyld | |
| 2012/0215366 A1 * | 8/2012 | Redmond | G05B 19/042 |
| | | | 700/284 |
| 2012/0289157 A1 | 11/2012 | Palin et al. | |
| 2012/0317194 A1 | 12/2012 | Tian | |
| 2013/0154917 A1 | 6/2013 | Adermann et al. | |
| 2013/0311694 A1 | 11/2013 | Bhamidipati et al. | |
| 2014/0037104 A1 | 2/2014 | Seo et al. | |
| 2014/0152235 A1 | 6/2014 | Huang et al. | |
| 2014/0341399 A1 | 11/2014 | Dusse et al. | |
| 2015/0054458 A1 * | 2/2015 | Yoon | H02J 7/025 |
| | | | 320/108 |
| 2015/0200558 A1 | 7/2015 | Castillo et al. | |
| 2015/0230022 A1 | 8/2015 | Sakai et al. | |
| 2015/0310846 A1 | 10/2015 | Andersen et al. | |
| 2015/0319554 A1 | 11/2015 | Blanche et al. | |
| 2015/0351143 A1 | 12/2015 | Seymour et al. | |
| 2016/0014492 A1 | 1/2016 | McCarthy et al. | |
| 2016/0029114 A1 | 1/2016 | Chen | |
| 2016/0073249 A1 | 3/2016 | Moore et al. | |
| 2016/0119708 A1 | 4/2016 | Rodzevski et al. | |
| 2016/0134141 A1 | 5/2016 | Jentz et al. | |
| 2016/0165381 A1 | 6/2016 | Kapoor et al. | |
| 2016/0180806 A1 | 6/2016 | Sharp et al. | |
| 2016/0241972 A1 | 8/2016 | Gobeli et al. | |
| 2016/0291666 A1 | 10/2016 | Hosoya et al. | |
| 2017/0013345 A1 | 1/2017 | Kumar et al. | |
| 2017/0048613 A1 | 2/2017 | Smus et al. | |
| 2017/0108906 A1 * | 4/2017 | Chandra | H02J 7/0013 |
| 2017/0134845 A1 | 5/2017 | Milam et al. | |
| 2017/0193974 A1 | 7/2017 | Gadonniex et al. | |
| 2017/0214994 A1 | 7/2017 | Gadonniex et al. | |
| 2017/0245039 A1 | 8/2017 | Chen | |
| 2017/0293577 A1 | 10/2017 | Gomzin et al. | |
| 2018/0067712 A1 | 3/2018 | Behzadi et al. | |
| 2018/0088897 A1 | 3/2018 | Mathur | |
| 2018/0341448 A1 | 11/2018 | Behzadi et al. | |
| 2018/0376528 A1 * | 12/2018 | Lee | H04W 4/80 |
| 2019/0052951 A1 | 2/2019 | Kofman et al. | |
| 2021/0255816 A1 | 8/2021 | Behzadi et al. | |

FOREIGN PATENT DOCUMENTS

| | | |
|---|---|---|
| CN | 104365173 A | 2/2015 |
| JP | 2009-532937 | 9/2009 |
| JP | 2011-521504 | 7/2011 |
| JP | 2013-051626 A | 3/2013 |
| KR | 2014-0018701 A | 2/2014 |
| KR | 2015-0021803 A | 3/2015 |
| KR | 101518010 B1 | 5/2015 |
| WO | WO 2012/170446 A2 | 12/2012 |
| WO | WO 2013030736 A1 | 3/2013 |
| WO | WO 2015/006950 A1 | 1/2015 |
| WO | WO 2015/185123 A1 | 12/2015 |
| WO | WO 2016/036541 A2 | 3/2016 |
| WO | WO 2016/063143 A1 | 4/2016 |
| WO | WO 2016/066483 A1 | 5/2016 |

OTHER PUBLICATIONS

Office Action, dated Feb. 27, 2017, received in U.S. Appl. No. 15/271,114, 18 pages.

Final Office Action, dated Nov. 9, 2017, received in U.S. Appl. No. 15/271,114, 18 pages.

Notice of Allowance, dated Apr. 10, 2018, received in U.S. Appl. No. 15/271,114, 10 pages.

Innovation Patent, dated Aug. 16, 2017, received in Australian Patent Application No. 2017101032, which corresponds with U.S. Appl. No. 15/271,114, 4 pages.

Office Action, dated Nov. 6, 2017, received in Australian Patent Application No. 2017101032, which corresponds with U.S. Appl. No. 15/271,114, 5 pages.

Certificate of Exam, dated May 1, 2018, received in Australian Patent Application No. 2017101032, which corresponds with U.S. Appl. No. 15/271,114, 1 page.

Notice of Acceptance, dated Feb. 19, 2019, received in Australian Patent Application No. 2017324072, which corresponds with U.S. Appl. No. 15/271,114, 3 pages.

Certificate of Grant, dated Jun. 13, 2019, received in Australian Patent Application No. 2017324072, which corresponds with U.S. Appl. No. 15/271,114, 1 page.

Office Action, dated Sep. 25, 2019, received in Chinese Patent Application No. 201710741130.4, which corresponds with U.S. Appl. No. 15/271,114, 5 pages.

Office Action, dated Dec. 16, 2016, received in Danish Patent Application No. 201670727, which corresponds with U.S. Appl. No. 15/271,114, 7 pages.

Office Action, dated May 29, 2017, received in Danish Patent Application No. 201670727, which corresponds with U.S. Appl. No. 15/271,114, 6 pages.

Office Action, dated Dec. 13, 2017, received in Danish Patent Application No. 201670727, which corresponds with U.S. Appl. No. 15/271,114, 6 pages.

Office Action, dated Aug. 16, 2019, received in European Patent Application No. 17746593.7, which corresponds with U.S. Appl. No. 15/271,114, 6 pages.

Office Action, dated Jul. 5, 2019, received in Japanese Patent Application No. 2019-506652, which corresponds with U.S. Appl. No. 15/271,114, 4 pages.

Notice of Allowance, dated Oct. 18, 2019, received in Japanese Patent Application No. 2019-506652, which corresponds with U.S. Appl. No. 15/271,114, 5 pages.

Patent, dated Nov. 22, 2019, received in Japanese Patent Application No. 2019-506652, which corresponds with U.S. Appl. No. 15/271,114, 3 pages.

Office Action, dated Jun. 17, 2019, received in Korean Patent Application No. 2019-7004211, which corresponds with U.S. Appl. No. 15/271,114, 3 pages.

(56) References Cited

OTHER PUBLICATIONS

Notice of Allowance, dated Sep. 17, 2019, received in Korean Patent Application No. 2019-7004211, which corresponds with U.S. Appl. No. 15/271,114, 4 pages.
Patent, dated Dec. 4, 2019, received in Korean Patent Application No. 2019-7004211, which corresponds with U.S. Appl. No. 15/271,114, 4 pages.
Office Action, dated Oct. 3, 2019, received in U.S. Appl. No. 16/056,328, 11 pages.
Notice of Allowance, dated Jan. 15, 2020, received in U.S. Appl. No. 16/056,328, 7 pages.
International Search Report and Written Opinion, dated Oct. 17, 2017, received in International Patent Application No. PCT/US2017/043047, which corresponds with U.S. Appl. No. 15/271,114, 12 pages.
Office Action, dated Jun. 18, 2020, received in Chinese Patent Application No. 201710741130.4, which corresponds with U.S. Appl. No. 15/271,114, 10 pages.
Office Action, dated Apr. 6, 2020, received in Korean Patent Application No. 2019-7035730, which corresponds with U.S. Appl. No. 16/056,328, 2 pages.
Notice of Allowance, dated Jun. 23, 2020, received in Korean Patent Application No. 2019-7035730, which corresponds with U.S. Appl. No. 16/056,328, 2 pages.
Notice of Allowance, dated Nov. 27, 2020, received in Chinese Patent Application No. 201710741130.4, which corresponds with U.S. Appl. No. 15/271,114, 3 pages.
Patent, dated Jan. 22, 2021, received in Chinese Patent Application No. 201710741130.4, which corresponds with U.S. Appl. No. 15/271,114, 6 pages.
Office Action, dated Jan. 12, 2021, received in Japanese Patent Application No. 2019-207313, which corresponds with U.S. Appl. No. 16/056,328, 5 pages.
Patent, dated Sep. 14, 2020, received in Korean Patent Application No. 2019-7035730, which corresponds with U.S. Appl. No. 16/056,328, 3 pages.
Notice of Allowance, dated Feb. 22, 2021, received in Australian Patent Application No. 2019203626, which corresponds with U.S. Appl. No. 16/056,328, 3 pages.
Certificate of Grant, dated Jun. 24, 2021, received in Australian Patent Application No. 2019203626, which corresponds with U.S. Appl. No. 16/056,328, 3 pages.
Office Action, dated Jul. 2, 2021, received from Chinese Patent Application No. 202011538744.0, which corresponds with U.S. Appl. No. 16/056,328, 4 page.
Office Action, dated Jun. 9, 2021, received in Chinese Patent Application No. 202011544171.2, which corresponds with U.S. Appl. No. 16/824,506, 1 page.
Notice of Allowance, dated May 24, 2021, received in Korean Patent Application No. 2020-7026460, which corresponds with U.S. Appl. No. 16/824,506, 2 pages.
Office Action, dated Aug. 5, 2021, received in U.S. Appl. No. 17/306,898, 6 pages.
Office Action, dated Oct. 18, 2021, received in Japanese Patent Application No. 2019-207313, which corresponds with U.S. Appl. No. 16/056,328, 2 pages.
Intent to Grant, dated Sep. 29, 2021, received in Australian Patent Application No. 2021201777, which corresponds with U.S. Appl. No. 16/824,506, 3 pages.
Office Action, dated Aug. 20, 2021, received in Korean Patent Application No. 2021-7022726, which corresponds with U.S. Appl. No. 17/306,898, 8 pages.
International Search Report and Written Opinion, dated Sep. 8, 2021, received in International Patent Application No. PCT/US2021/033200, which corresponds with U.S. Appl. No. 17/023,265, 17 pages.

* cited by examiner

622 After pairing of the electronic device with the first peripheral, determine whether the second peripheral and the first peripheral are part of a predefined set of associated peripherals that have been previously paired with the electronic device; in accordance with a determination that the second peripheral and the first peripheral are part of a predefined set of associated peripherals that have been previously paired with the electronic device, display status information concerning the first peripheral and the second peripheral; and, in accordance with a determination that the second peripheral and the first peripheral are not part of a predefined set of associated peripherals that have been previously paired with the electronic device, display information concerning a mismatch between the first peripheral and the second peripheral 624 Displaying information concerning the mismatch between the first peripheral and the second peripheral includes displaying a second pairing affordance that, when activated by a user input, initiates pairing of the electronic device with the second peripheral 626 Displaying the status information concerning the first peripheral and the second peripheral includes displaying a single combined peripheral status characteristic concerning the first peripheral and the second peripheral in accordance with a determination that a difference between a first peripheral status characteristic of the first peripheral and a second peripheral status characteristic of the second peripheral is less than a predetermined threshold and the first peripheral and the second peripheral are the same type of peripheral 628 Displaying status information concerning the first peripheral and the second peripheral includes displaying a first peripheral status characteristic concerning the first peripheral and displaying a second peripheral status characteristic concerning the second peripheral in accordance with a determination that a difference between the first peripheral status characteristic of the first peripheral and the second peripheral status characteristic of the second peripheral is greater than a predetermined threshold and the first peripheral and the second peripheral are the same type of peripheral 630 Displaying the status information of the first peripheral includes displaying a low battery graphic in accordance with a determination that a battery level concerning the first peripheral falls below a minimum charge threshold 632 Displaying the status information of the first peripheral includes displaying a charging battery graphic in accordance with a determination that a first peripheral is connected to a power source

Figure 6B

634 The electronic device is in a locked state while displaying the first user interface. After activating the pairing affordance, present a request for an authentication input from a user to pair the first peripheral with the electronic device; receive the authentication input from the user; and, in response to receiving the authentication input: pair the first peripheral with the electronic device; and maintain the electronic device in the locked state 636 Maintain display of the first user interface associated with the locked state of the electronic device while pairing the first peripheral with the electronic device 638 Maintain display of the first user interface associated with the locked state of the electronic device after pairing the first peripheral with the electronic device is completed 640 While maintaining display of the first user interface associated with the locked state of the electronic device after pairing the first peripheral with the electronic device is completed, display status information concerning the first peripheral

Figure 6C

DEVICES, METHODS, AND GRAPHICAL USER INTERFACES FOR WIRELESS PAIRING WITH PERIPHERAL DEVICES AND DISPLAYING STATUS INFORMATION CONCERNING THE PERIPHERAL DEVICES

RELATED APPLICATIONS

This application is a continuation of U.S. application Ser. No. 16/056,328, filed Aug. 6, 2018, which is a continuation of U.S. application Ser. No. 15/271,114, filed Sep. 20, 2016, now U.S. Pat. No. 10,042,595, which claims priority to U.S. Provisional Application Ser. No. 62/383,976, filed Sep. 6, 2016, each of which is incorporated by reference herein in its entirety.

TECHNICAL FIELD

This relates generally to wireless pairing of electronic devices, including but not limited to pairing an electronic device with peripheral devices and displaying status information concerning the peripheral devices.

BACKGROUND

The use of wireless peripheral devices that communicate with an electronic device of a user (e.g., a smartphone, tablet, or other computing device) has increased substantially in recent years. Wireless pairing technologies, such as Bluetooth®, are often used to connect ("pair") peripherals to such devices.

But conventional methods for performing pairing are cumbersome and inefficient, especially when multiple peripheral devices are involved. For example, a user may need to pair each peripheral individually with a given electronic device, before using the peripherals with the device.

SUMMARY

Accordingly, there is a need for electronic devices with faster, more efficient methods and interfaces for pairing with peripheral devices and displaying status information concerning the peripheral devices. Such methods and interfaces optionally complement or replace conventional methods for pairing peripherals. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, radio frequency (RF) circuitry for wirelessly communicating with one or more peripheral devices, and one or more input devices for receiving inputs from a user. The device displays a first user interface on the display. While displaying the first user interface, the device detects a pairing request to pair a first peripheral with the electronic device. In response to detecting the pairing request, the device determines whether the first peripheral meets coupling criteria, wherein the coupling criteria require that the first peripheral is coupled to a second peripheral. In accordance with a determination that the first peripheral meets the coupling criteria, the device displays a pairing affordance that, when activated by a user input, initiates pairing of the electronic device with the first peripheral. In accordance with a determination that the first peripheral does not meet the coupling criteria, the device displays information concerning coupling of the first peripheral and the second peripheral.

In accordance with some embodiments, an electronic device includes a display, radio frequency (RF) circuitry for wirelessly communicating with one or more peripheral devices, one or more input devices for receiving inputs from a user, and a processing unit coupled to the display unit, the radio frequency (RF) circuitry, and the one or more input devices. The processing unit enables display of a first user interface on the display unit. While displaying the first user interface, the processing unit detects a pairing request to pair a first peripheral with the electronic device. In response to detecting the pairing request, the processing unit determines whether the first peripheral meets coupling criteria, wherein the coupling criteria require that the first peripheral is coupled to a second peripheral. In accordance with a determination that the first peripheral meets the coupling criteria, the processing unit enables display of a pairing affordance that, when activated by a user input, initiates pairing of the electronic device with the first peripheral. In accordance with a determination that the first peripheral does not meet the coupling criteria, the processing unit enables display of information concerning coupling of the first peripheral and the second peripheral.

Thus, electronic devices with displays, radio frequency (RF) circuitry, and one or more input devices are provided with faster, more efficient methods and interfaces for pairing with peripheral devices and displaying status information concerning the peripheral devices, thereby increasing the effectiveness, efficiency, and user satisfaction with such devices. Such methods and interfaces may complement or replace conventional methods for pairing peripherals.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams illustrating a method of pairing an electronic device with peripheral devices and displaying status information concerning the peripheral devices in accordance with some embodiments.

DESCRIPTION OF EMBODIMENTS

Many conventional electronic devices have the capability to pair with peripherals. However, when two or more peripherals are related (e.g., two earbuds or two earbuds and a case for the earbuds), conventional electronic devices typically need to pair individually with each peripheral before use. In contrast, as described herein, related peripherals can be paired simultaneously to a given device, thereby providing the capability to synchronize pairing between multiple peripherals in response to a single pairing action. Providing improved pairing functionality to the user enhances the operability of the device and makes the user-device interface more efficient (e.g., by helping the user to efficiently pair with multiple related peripherals in a single action, thereby reducing user mistakes when attempting to pair a given device to multiple related peripherals). Without this improved pairing process, the user would have to take additional steps to get the device to individually pair with different peripherals, to achieve the same functionality as described herein. Individually pairing a device with multiple peripherals can be a time-consuming process, and the user is more prone to making mistakes due to the increased number of user inputs required to complete the pairing process.

In addition, conventional electronic devices display little or no status information concerning the paired peripherals. However, as described herein, status information concerning the peripherals is displayed (e.g., one or more battery levels) when the peripherals are proximate to the device. Providing status information of the peripherals enhances the operability of the device and makes the user-device interface more efficient (e.g., by providing access to information concerning the peripherals without the user having to physically inspect each peripheral), thereby enabling the user to use the device and the peripherals more quickly and efficiently.

Figure 5A:
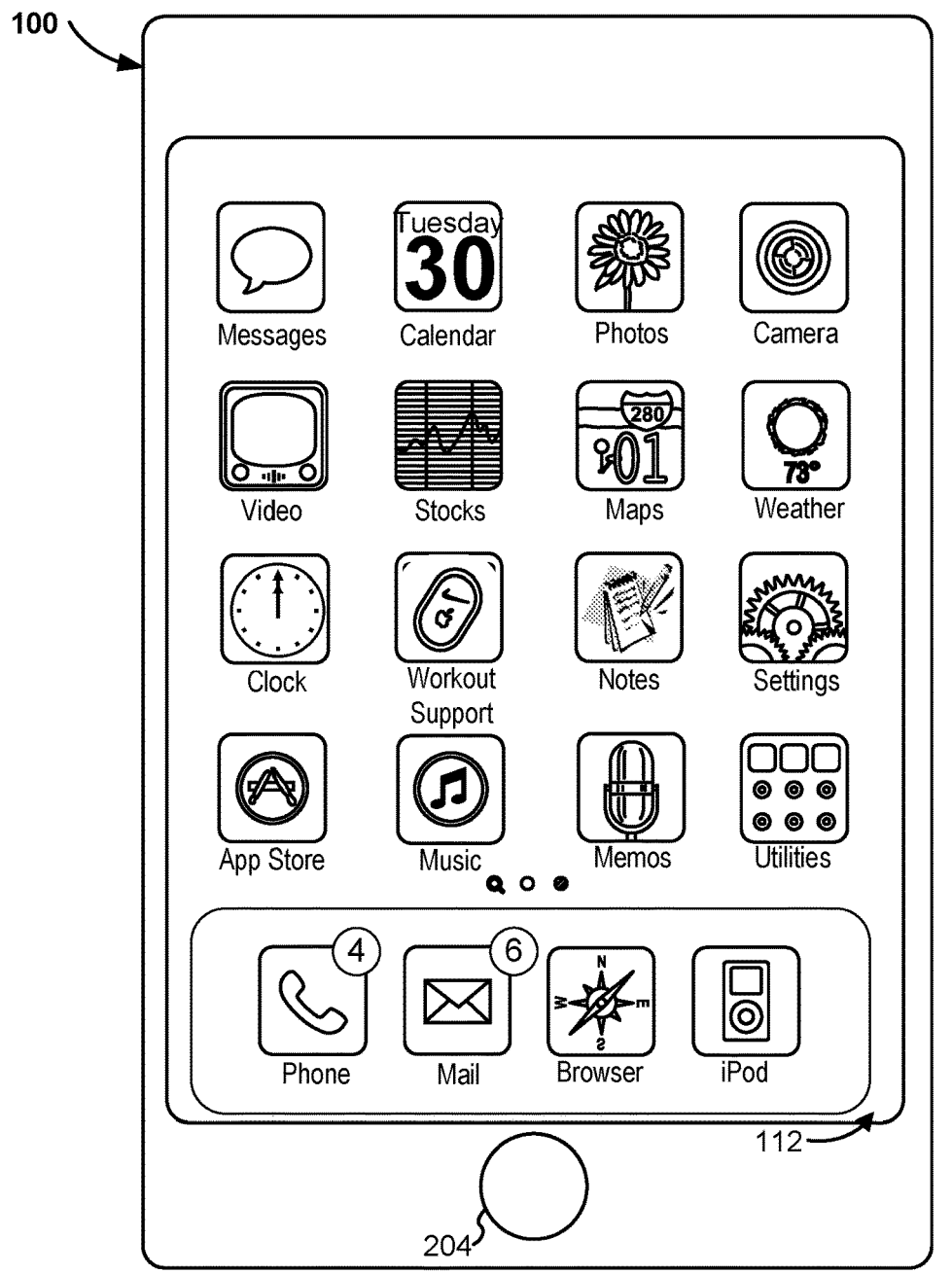
FIGS. 5A-5Z illustrate example user interfaces for pairing an electronic device with peripheral devices and displaying status information concerning the peripheral devices in accordance with some embodiments.
Figure 5A:
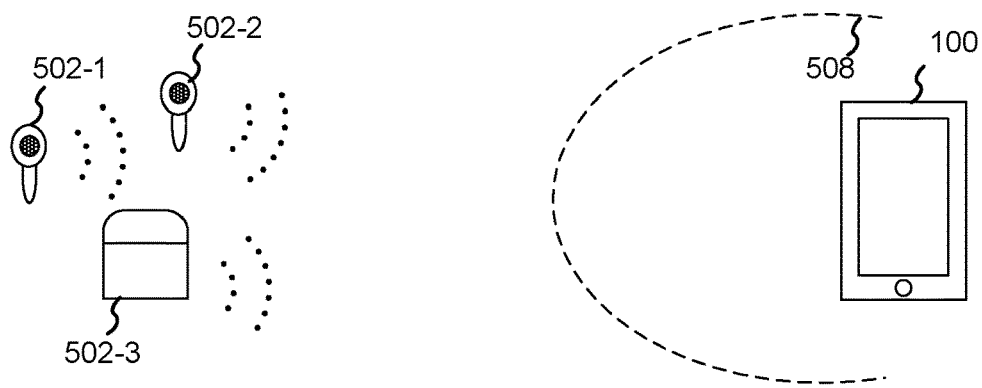
Figure 5Z:
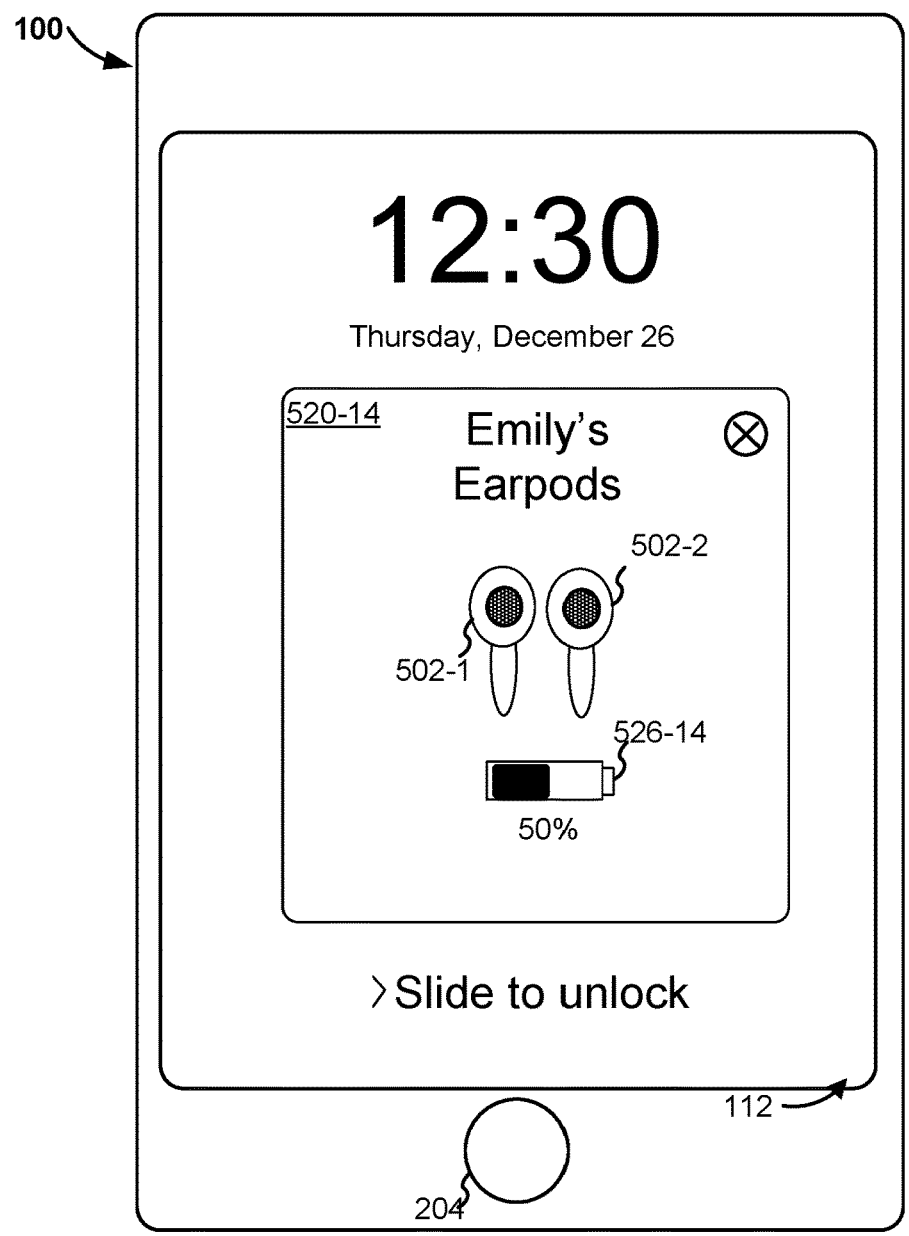
Figure 5Z:
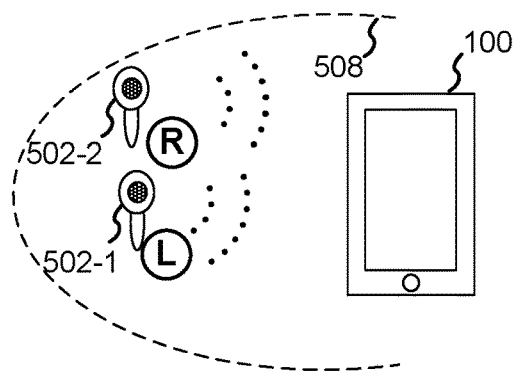
Figure 6A:
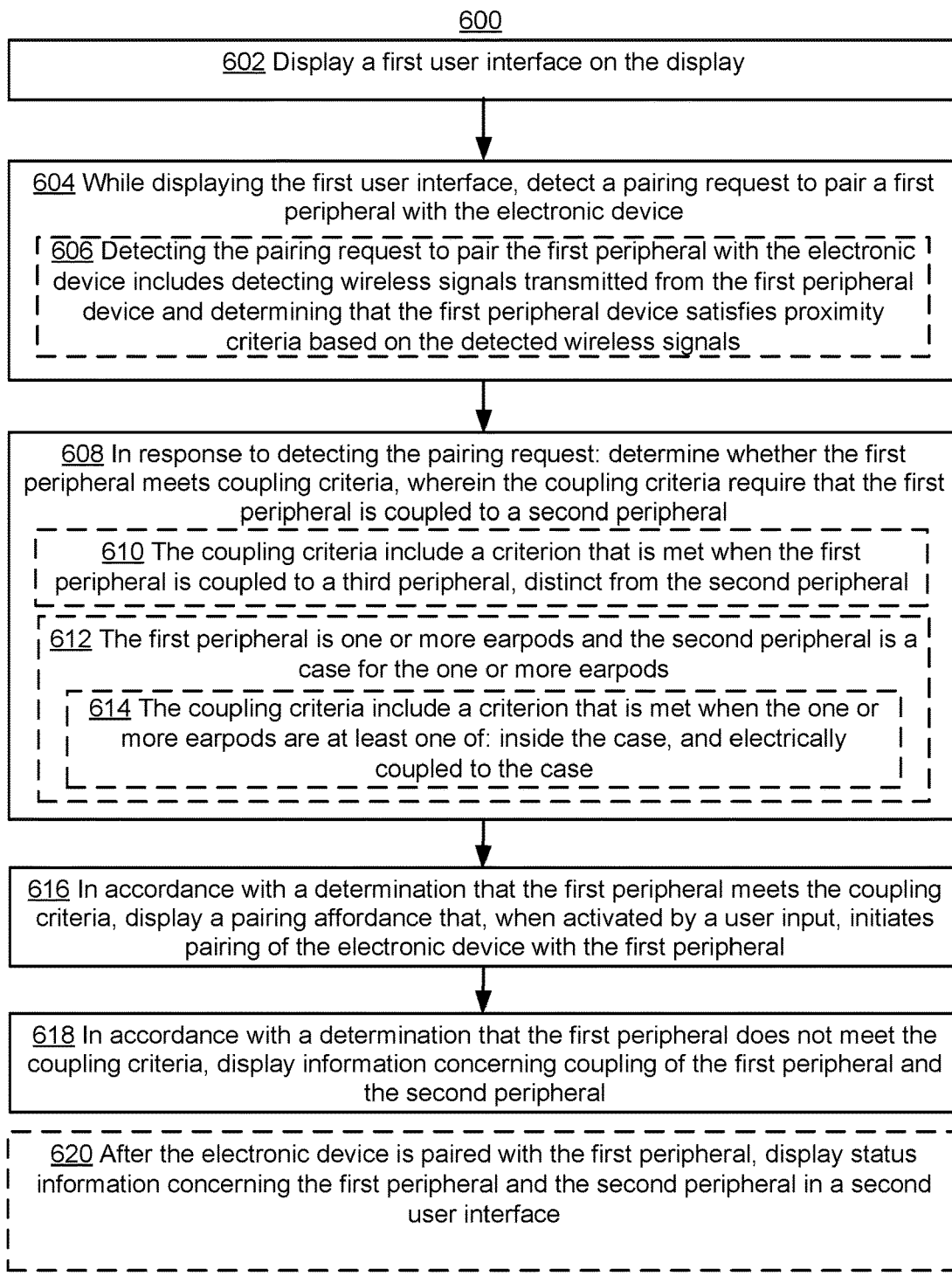

Below, FIGS. 1A-1B, 2, 3 and 7 provide a description of example devices. FIGS. 4A-4B and 5A-5Z illustrate example user interfaces for selectively pairing the peripherals with an example device and selectively displaying status information concerning the peripherals on the example device. FIGS. 6A-6C are flow diagrams illustrating a method of pairing an electronic device with peripheral devices and displaying status information concerning the peripheral devices. The user interfaces in FIGS. 5A-5Z are used to illustrate the processes in FIGS. 6A-6C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
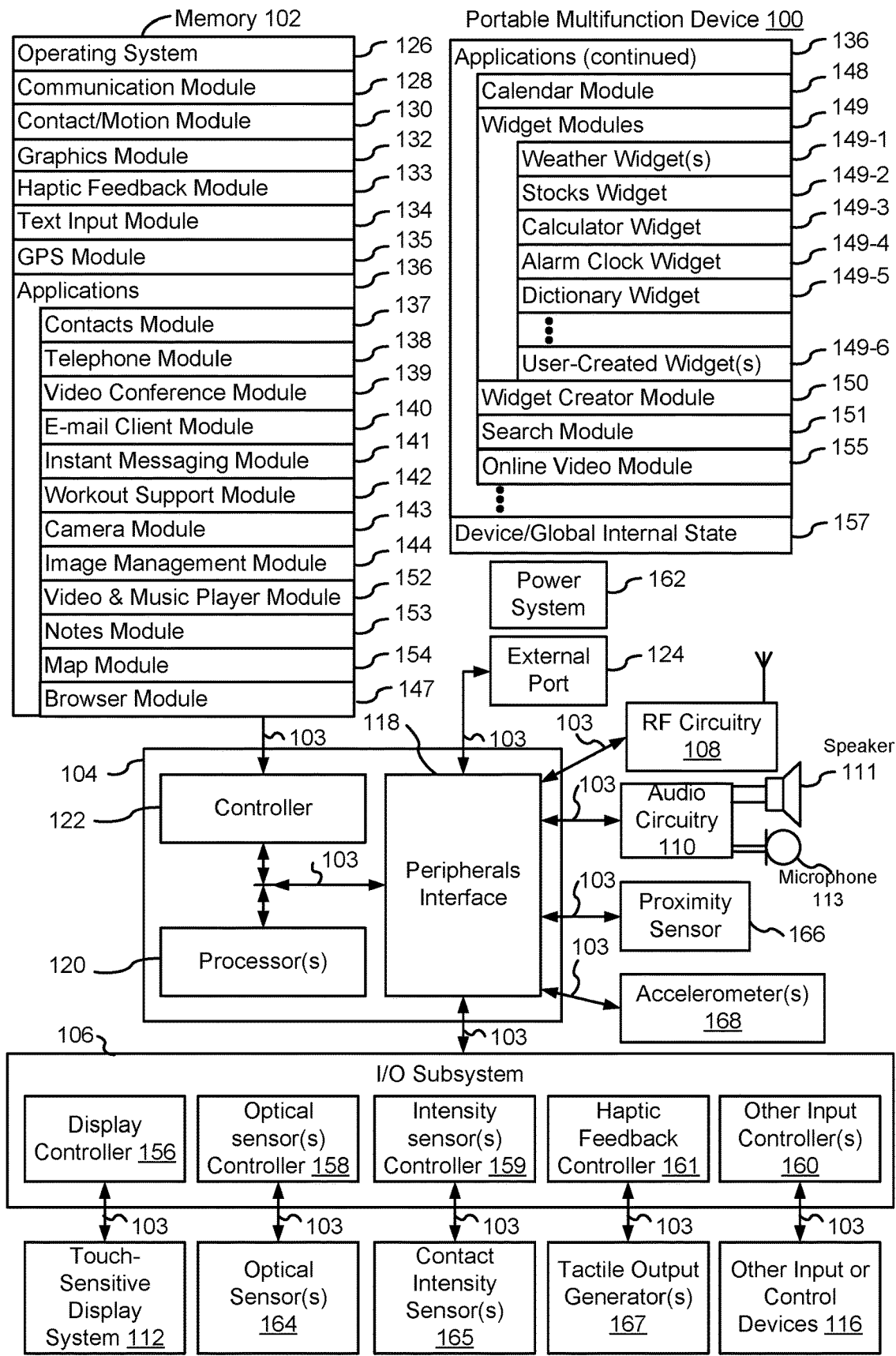
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" is physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
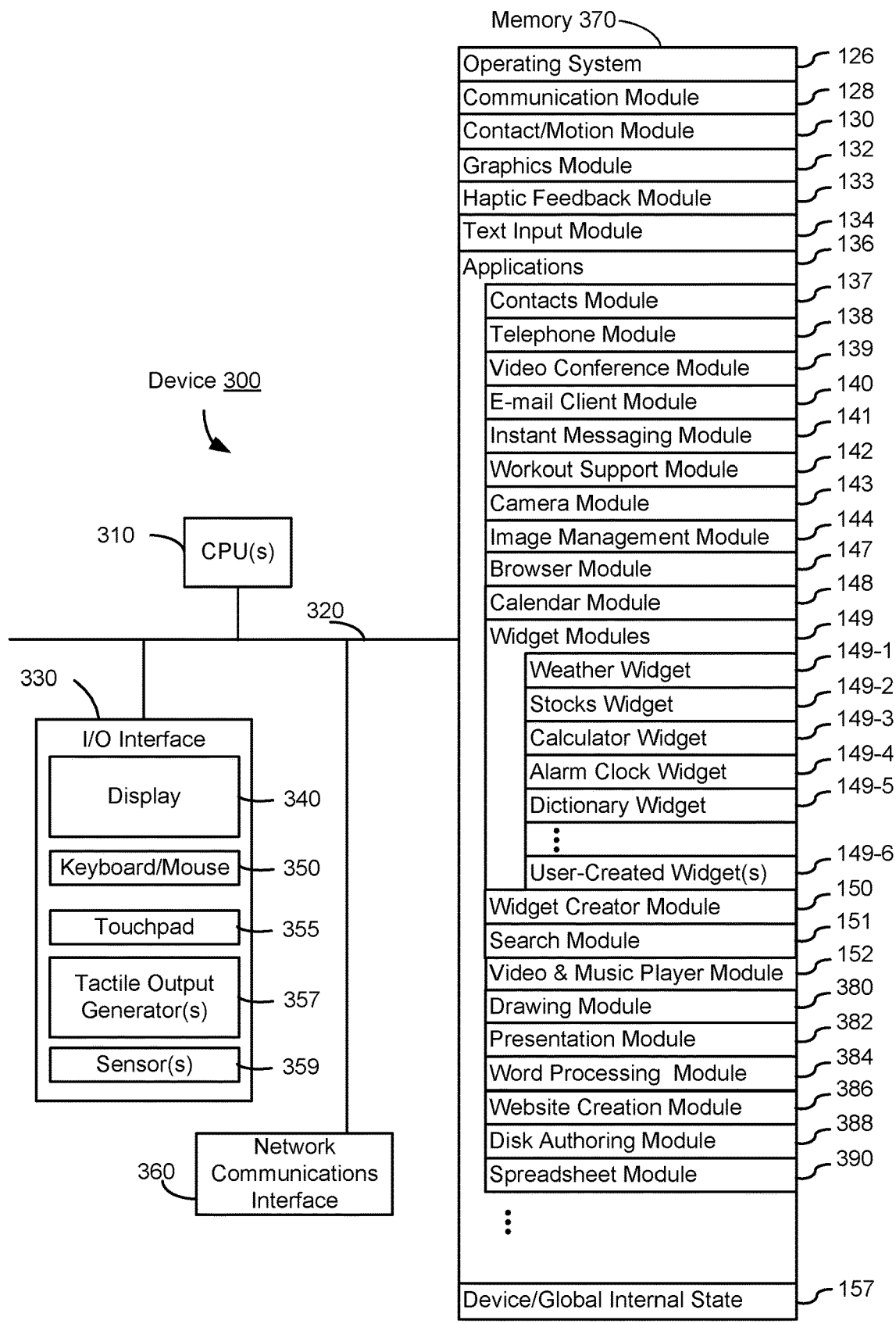
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
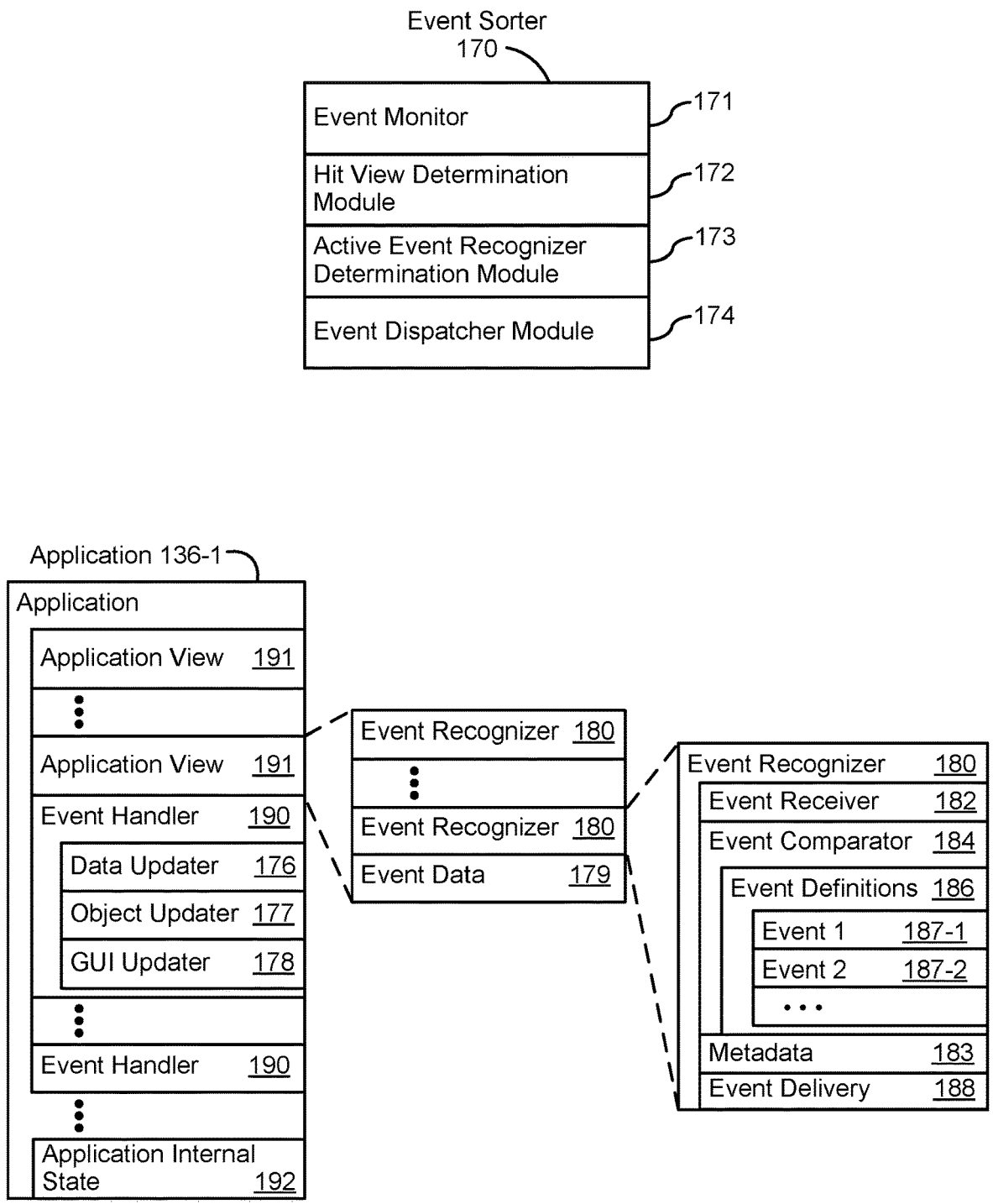
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
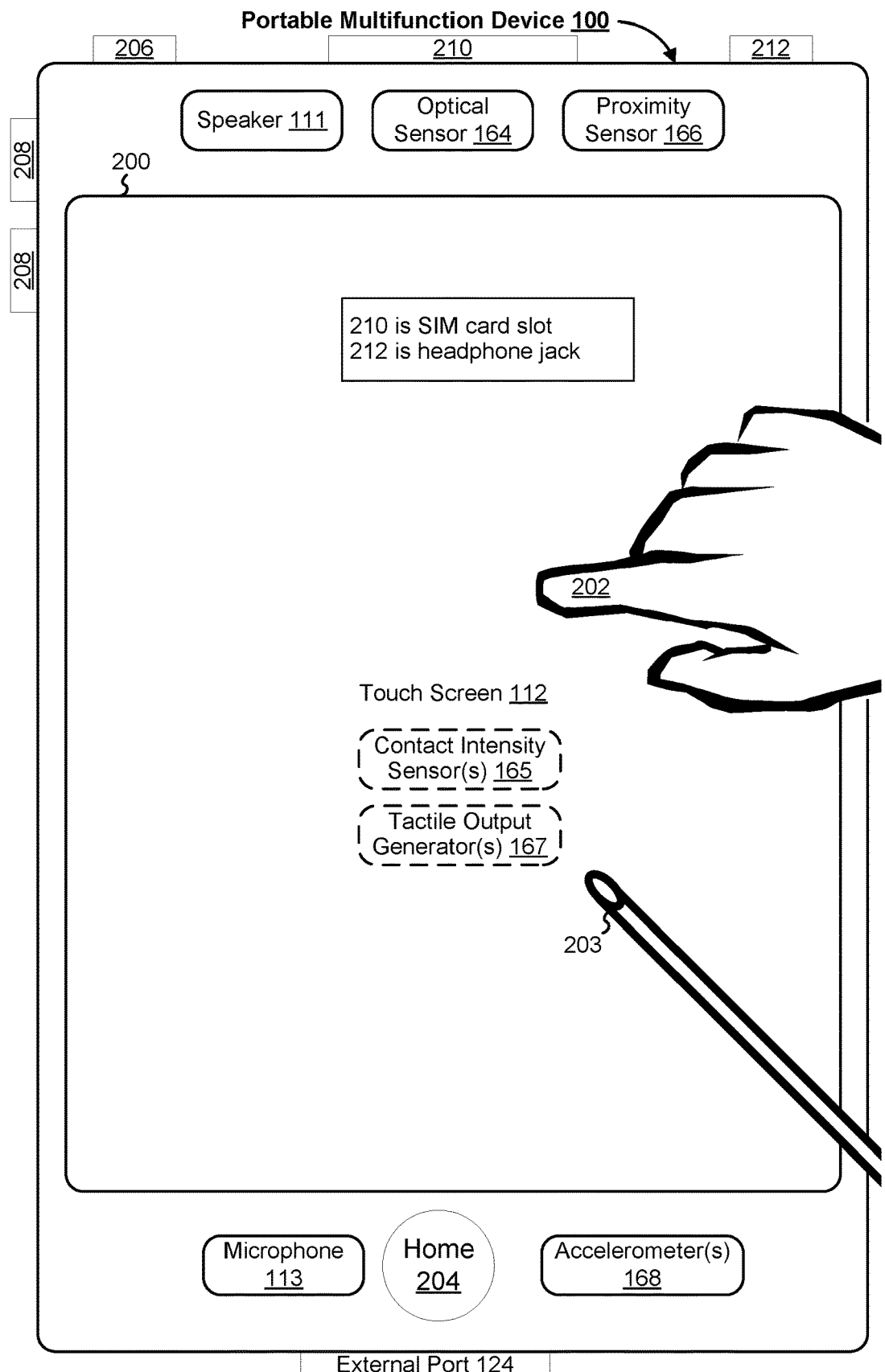
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
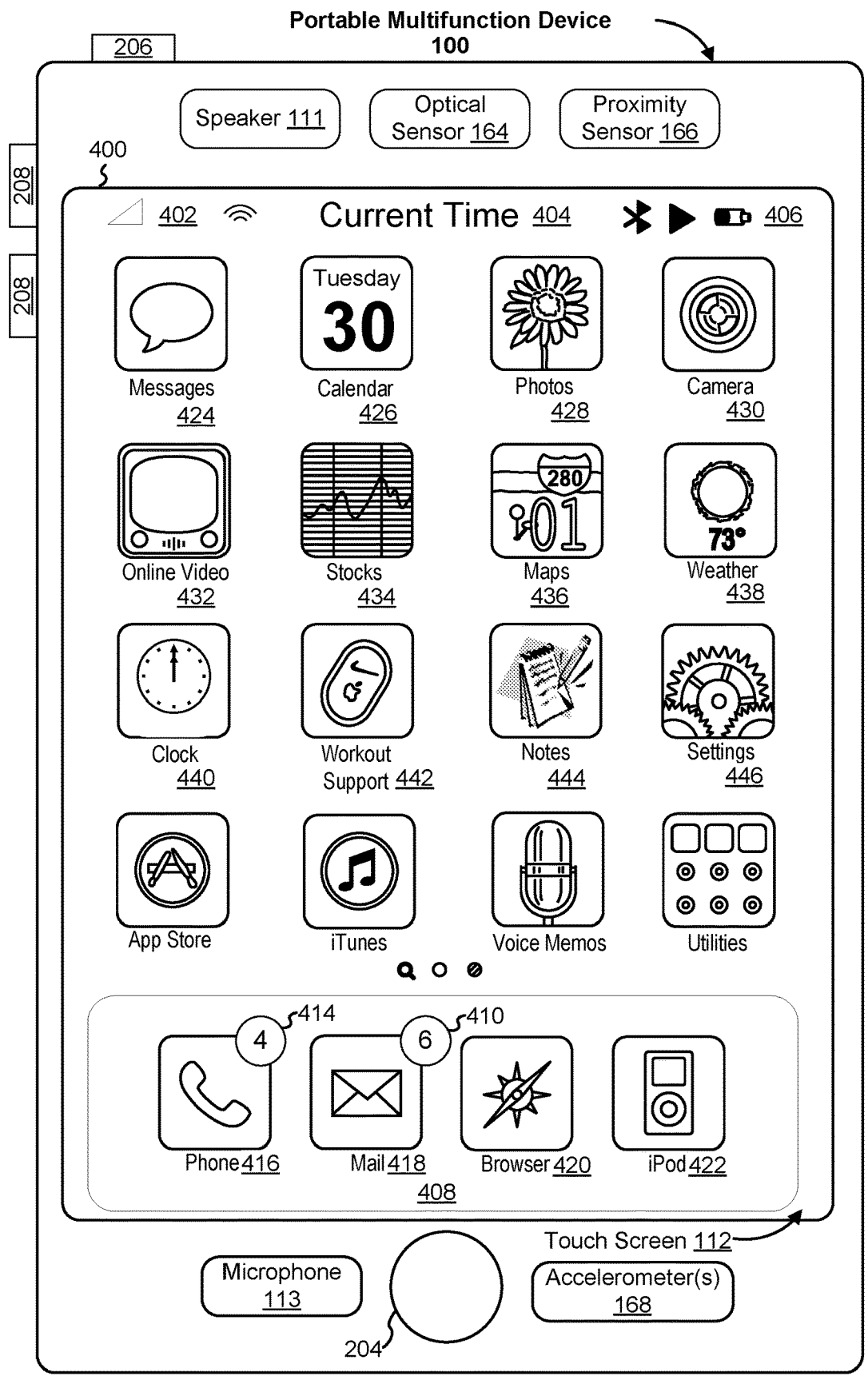
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
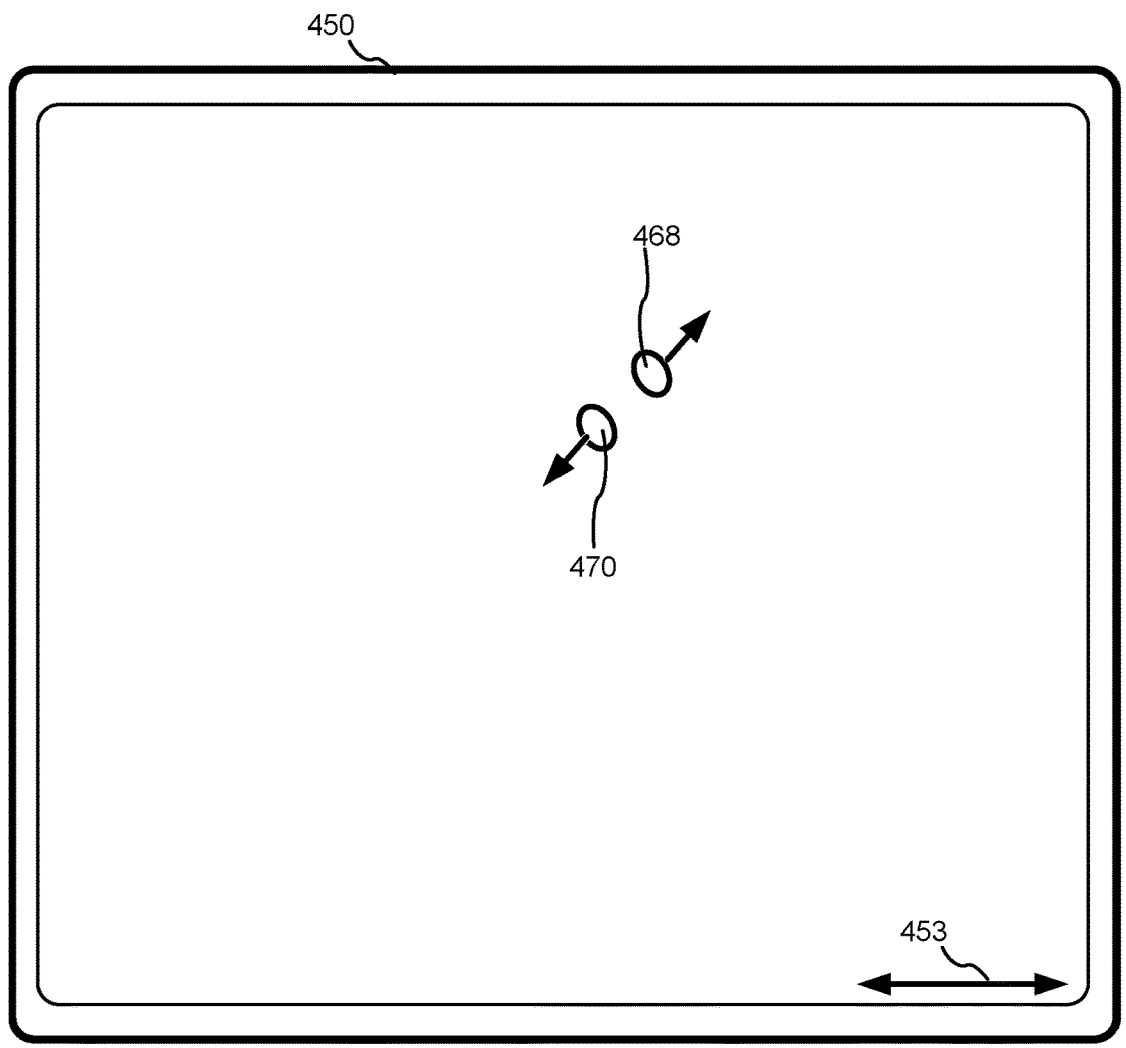
FIG. 4B illustrates an example user interface for a multifunction device with a touch-sensitive surface that is separate from the display in accordance with some embodiments.
Figure 4B:
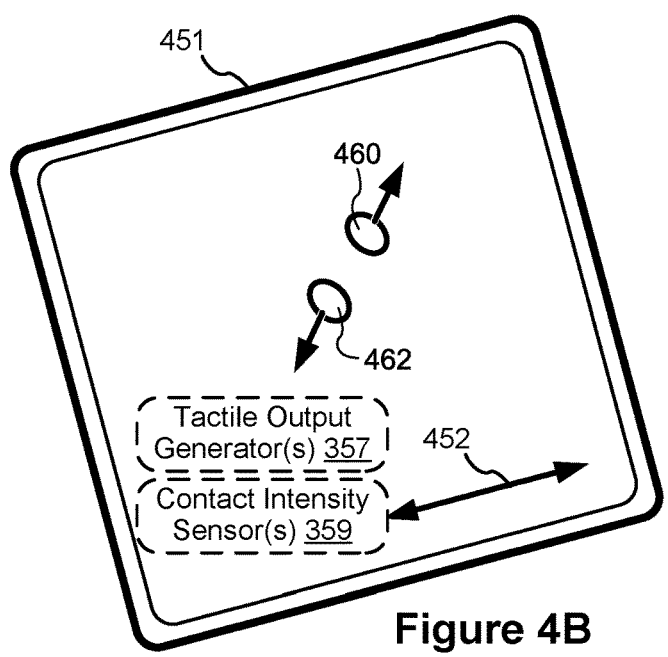

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensities of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device, such as portable multifunction device 100 or device 300, with a display, radio frequency (RF) circuitry for wirelessly communicating with one or more peripheral devices, one or more input devices for receiving inputs from a user (e.g., a touch-sensitive surface), and (optionally) one or more sensors to detect intensities of contacts with the touch-sensitive surface.

FIGS. 5A-5Z illustrate example user interfaces for pairing an electronic device with peripheral devices and displaying status information concerning the peripheral devices in accordance with some embodiments. The user interfaces in these figures are used to illustrate the processes described below, including the processes in FIGS. 6A-6C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5B:
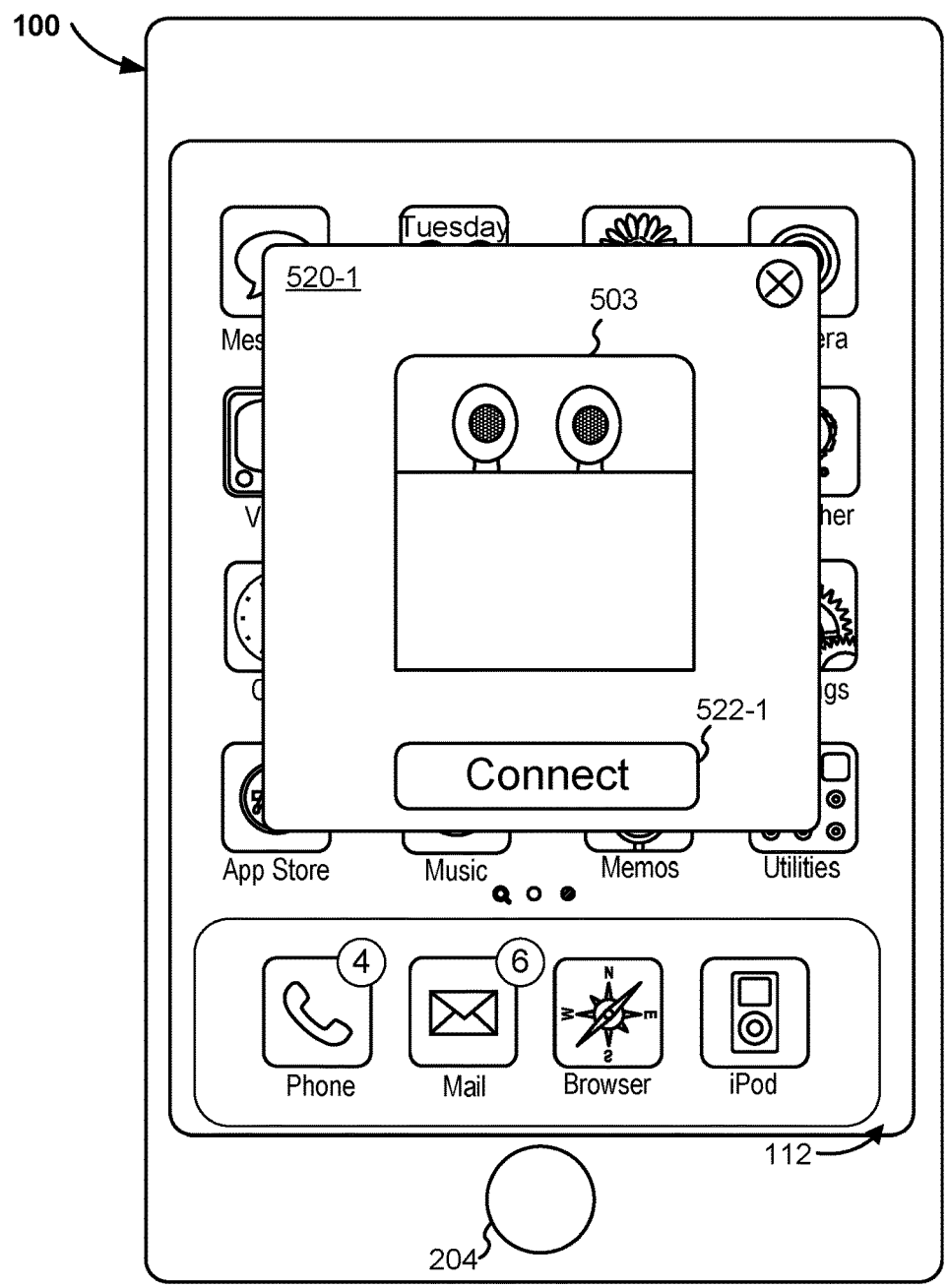

FIG. 5A illustrates an example user interface on the display 112 of device 100. While displaying the user interface, the device 100 periodically and repeatedly listens for wireless broadcast signals (e.g., pairing requests) from one or more peripherals (e.g., earbuds 502-1 and 502-2, as well as earbud case 502-3) to pair the peripheral(s) with the device 100. In some embodiments, as illustrated throughout FIGS. 5A-5Z, the device 100 can detect pairing requests from a peripheral when the peripheral is within a threshold distance 508 of the device 100 and cannot detect pairing requests from the peripheral when the peripheral is outside of the threshold distance 508. For example, the bottom of FIG. 5A illustrates an example spatial relationship (e.g., physical distance) between the device 100 and earbuds 502-1 and 502-2 as well as earbud case 502-3, where earbuds 502-1 and 502-2 as well as earbud case 502-3 are outside of the threshold distance 508 of the device 100. In contrast, FIG. 5B illustrates where earbud 502-1, earbud 502-2 and earbud case 502-3 (referred to collectively as earbud set 503) are within a threshold distance 508 of the device 100, where the device is capable of detecting pairing requests from the peripherals. (Note that earbuds are also referred to as earpods, earphones, and in-ear headphones.)

FIG. 5B illustrates an example user interface, displayed subsequent to the user interface in FIG. 5A, for initiating pairing of the device 100 with a peripheral (e.g. earbud 502-1). In FIG. 5B, the device 100 detects a pairing request from a peripheral (e.g., earbud 502-1 shown in FIG. 5A and part of earbud set 503) within the threshold distance 508. In response to detecting the pairing request from the earbud 502-1, the device 100 determines whether the earbud 502-1 meets coupling criteria. In the example shown in FIG. 5B, the coupling criteria are met when an earbud 502-1 is placed within and/or electrically coupled to an earbud case 502-3 to form earbud set 503. After the device 100 determines that the earbud 502-1 meets coupling criteria, the device 100 displays a window 520-1 overlaid on the first user interface that shows the earbud set 503. The window 520-1 includes a "Connect" button 522-1, that, when activated by a user input (e.g., a tap gesture), initiates pairing of the device 100 with the peripherals (e.g., earbuds 502-1 and 502-2 and earbud case 502-3 shown in FIG. 5A) of earbud set 503.

Figure 5C:
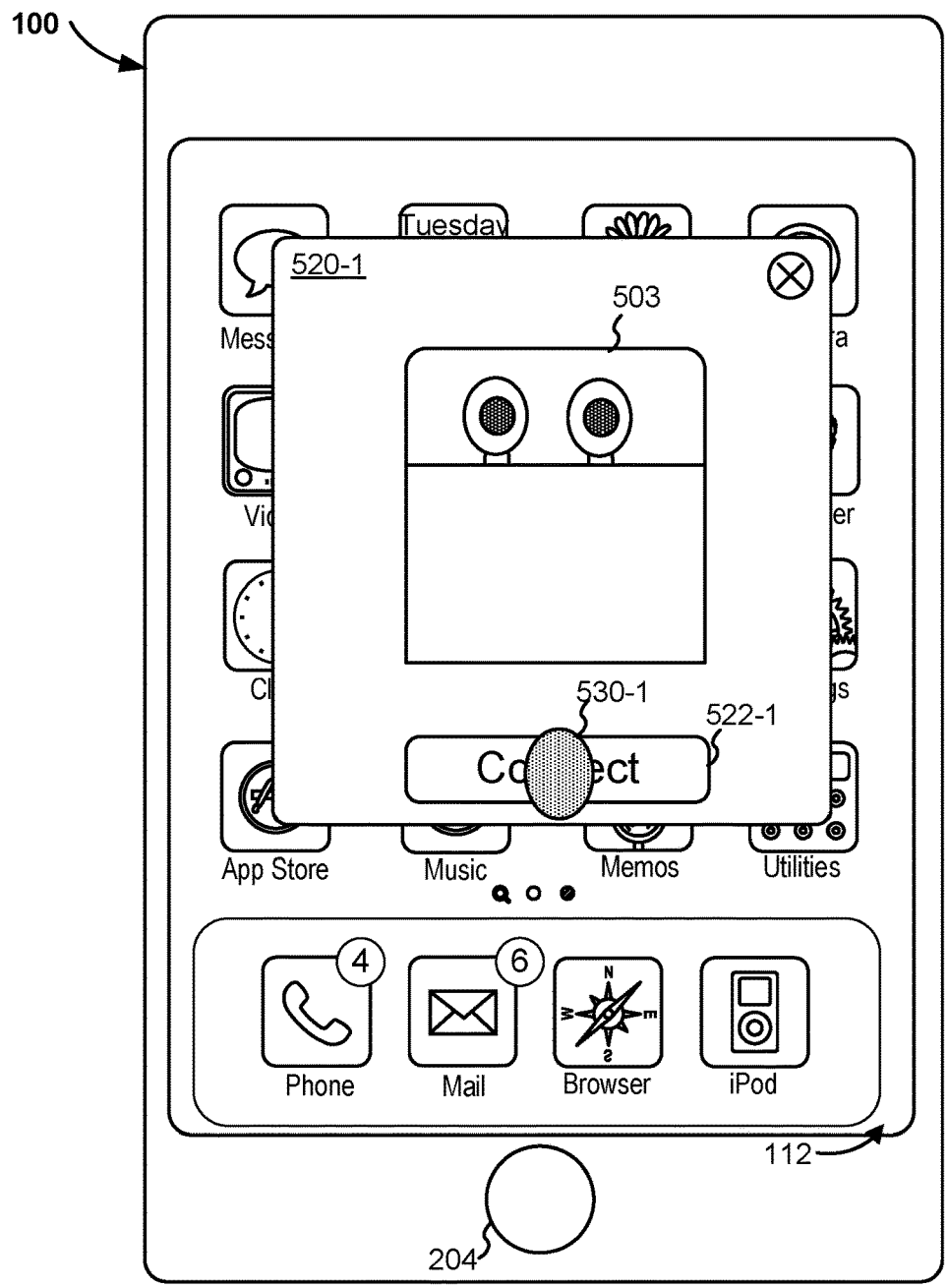
Figure 5D:
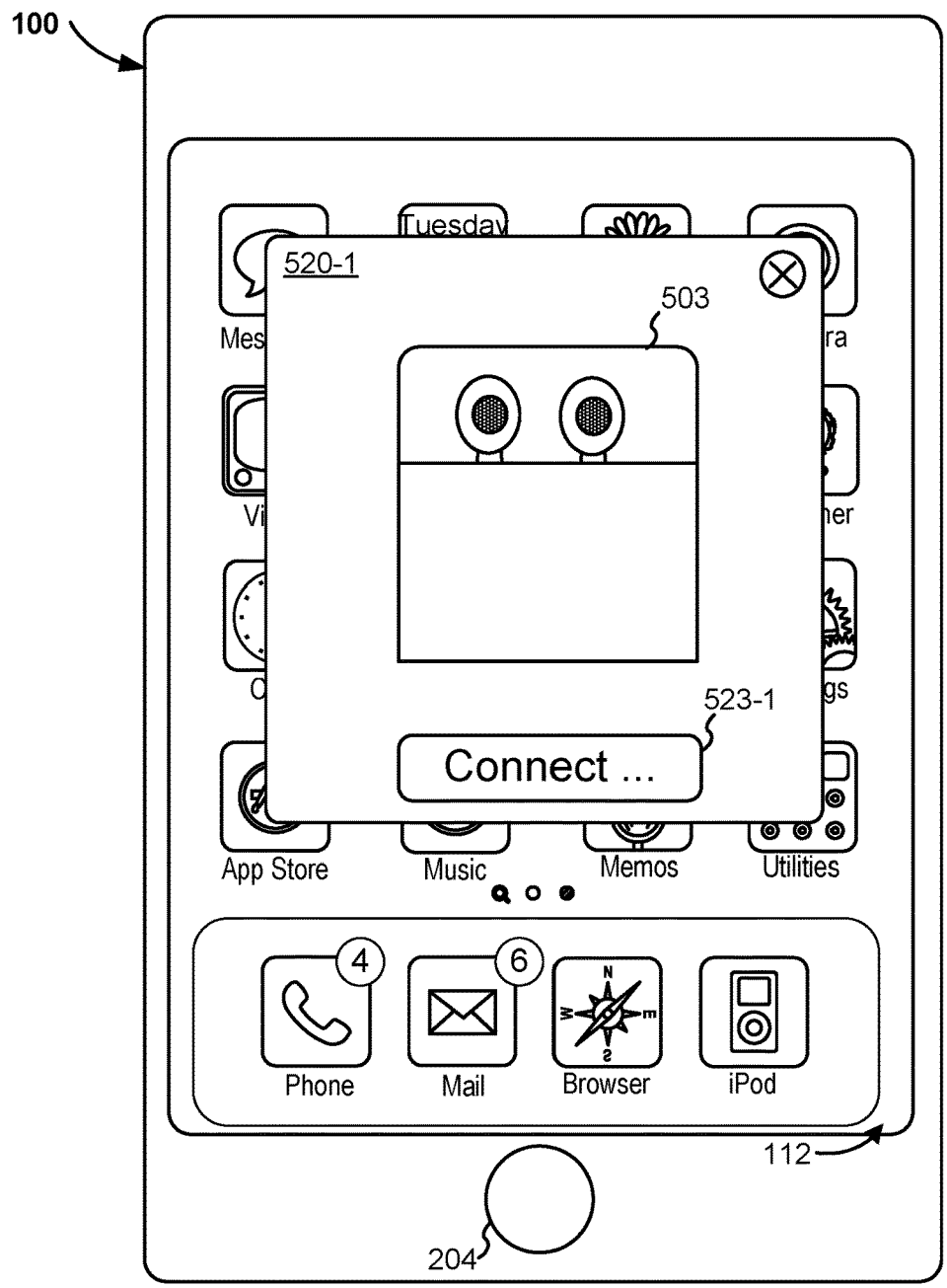
Figure 5D:
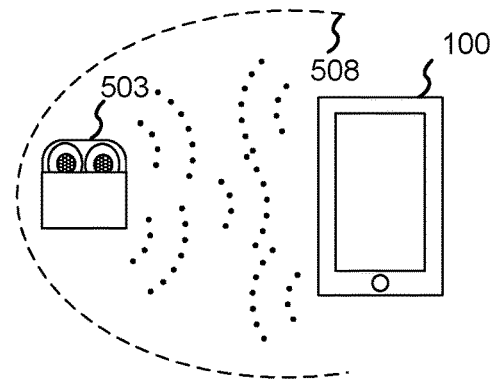
Figure 5E:
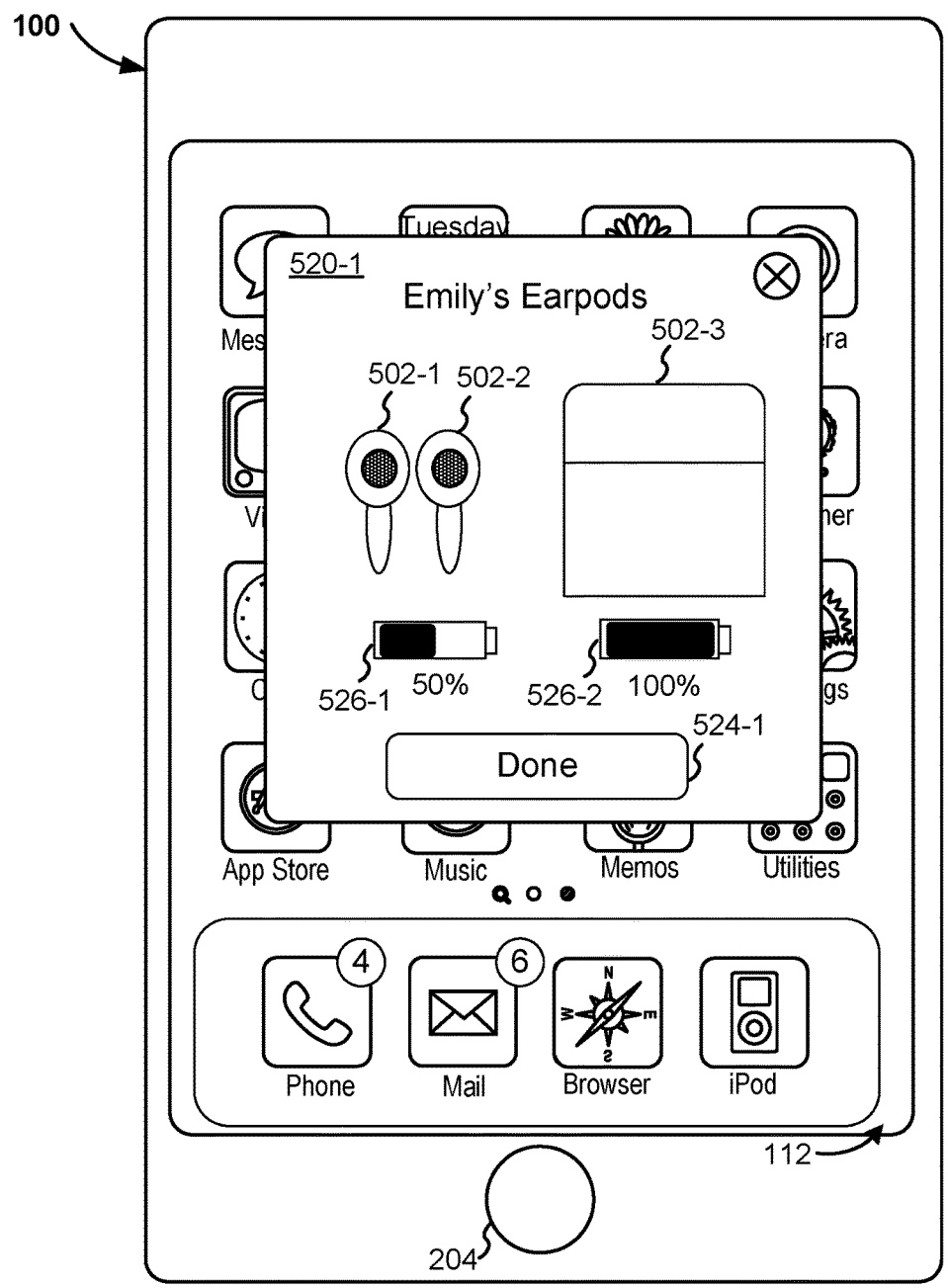
Figure 5E:
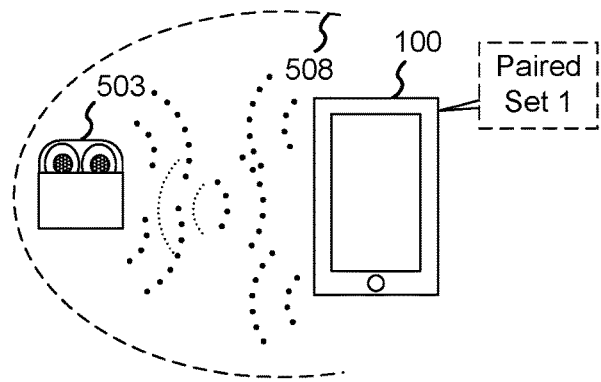

FIGS. 5C-5E illustrate an example user interface, displayed subsequent to the user interface in FIG. 5B, for initiating pairing of a peripheral (e.g., earbud 502-1 of earbud set 503) with the device 100. In FIG. 5C, the device 100 detects a tap gesture 530-1 on the button 522-1. In response to detecting the tap gesture 530-1, the device 100 initiates pairing of the device 100 with the peripherals of earbud set 503. In FIG. 5D, while the device 100 is pairing with the peripherals of earbud set 503, the device 100 displays a "Connect . . . " notification graphic 523-1 in window 520-1. In FIG. 5E, after the device 100 pairs with the peripherals of earbud set 503, the device 100 displays status information including a battery level graphic 526-1 indicating the battery level of the earbuds 502-1 and 502-2 and a battery level graphic 526-2 indicating the battery level of the earbud case 502-3, in the window 520-1. The device 100 also displays a "Done" button 524-1 that, when activated by a user input, such as a tap gesture, ceases display of the window 520-1 and allows the user to perform other conventional operations on device 100. In some embodiments, window 520-1 ceases to be displayed after a predetermined period of time, even if the "Done" button is not activated.

Figure 5F:
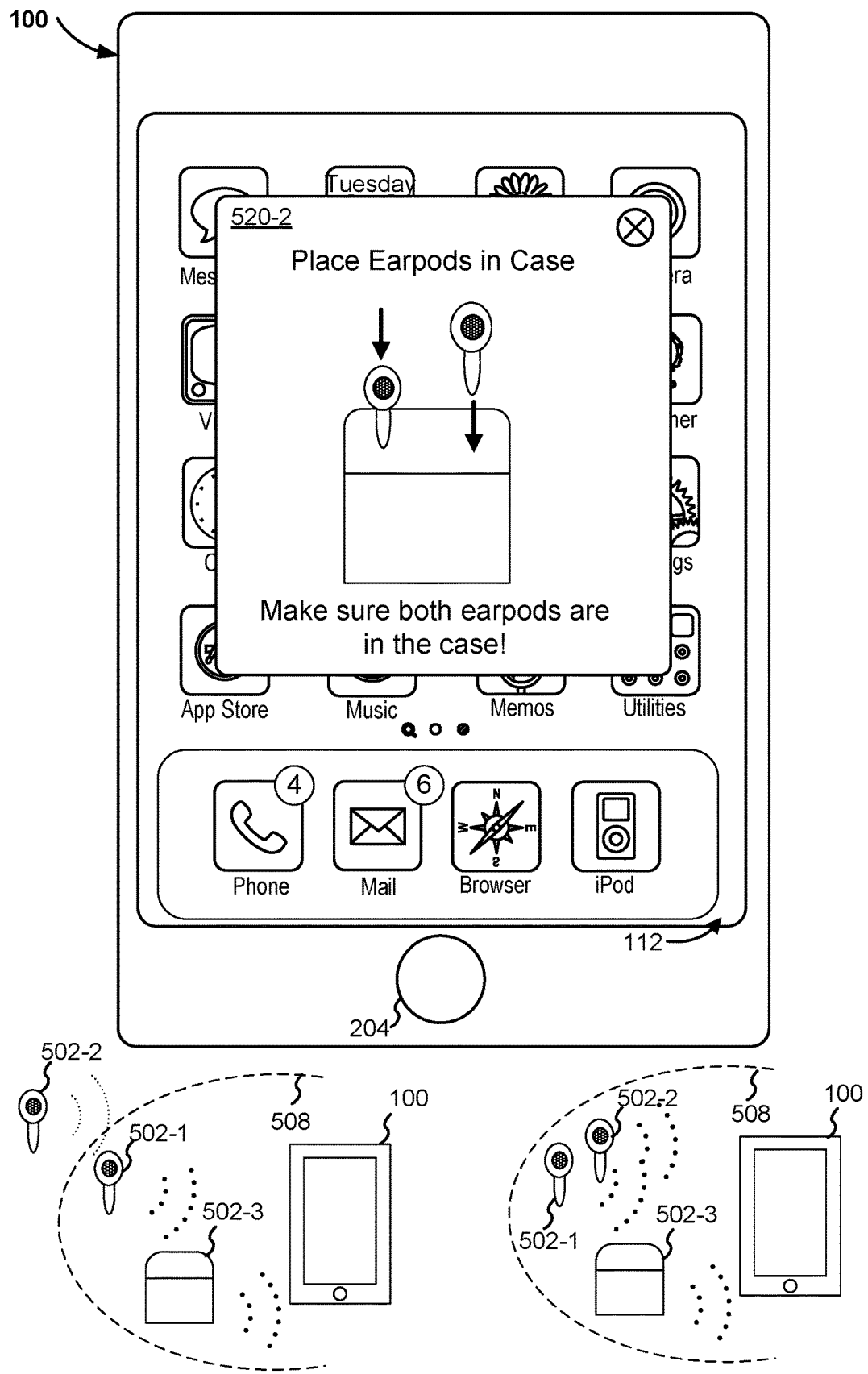

FIG. 5F illustrates an example user interface, displayed subsequent to the user interface in FIG. 5A, for displaying information concerning pairing the device 100 with a peripheral (e.g. earbud 502-1) when coupling criteria are not met. In FIG. 5F, the device 100 detects a pairing request from earbud 502-1 within the threshold distance 508. In response to detecting the pairing request from the earbud 502-1, the device 100 determines whether the earbud 502-1 meets coupling criteria. In the example shown in FIG. 5F, coupling criteria are not met when an earbud 502-1 is not placed within and/or not electrically coupled to an earbud case 502-3. Two different examples where earbud 502-1 does not meet coupling criteria are illustrated at the bottom of FIG. 5F. In the bottom left portion of FIG. 5F, earbud 502-1 and earbud case 502-3 are within the threshold distance 508 while earbud 502-2 is not within the threshold distance 508. In the bottom right portion of FIG. 5F, earbud 502-1, earbud 502-2 and earbud case 502-3 are all within the threshold distance 508. However, in both example embodiments, earbud 502-1 is not placed within nor electrically coupled to the earbud case 502-3 and therefore does not meet the coupling criteria. After the device 100 determines that the earbud 502-1 does not meet coupling criteria, the device 100 displays a window 520-2 overlaid on the first user interface that displays information concerning coupling the earbud 502-1 (and, optionally, earbud 502-2) to the case 502-3, such as a graphic directing the user to "Place Earpods in Case" and "Make sure both earpods are in the case!"). After the earbud 502-1 meets the coupling criteria (e.g., after earbud 502-1 is placed in the earbud case 502-3, as shown in FIG. 5B) the device 100 displays a user interface like that shown in FIG. 5B for pairing the device 100 with the earbud set 503.

Figure 5G:
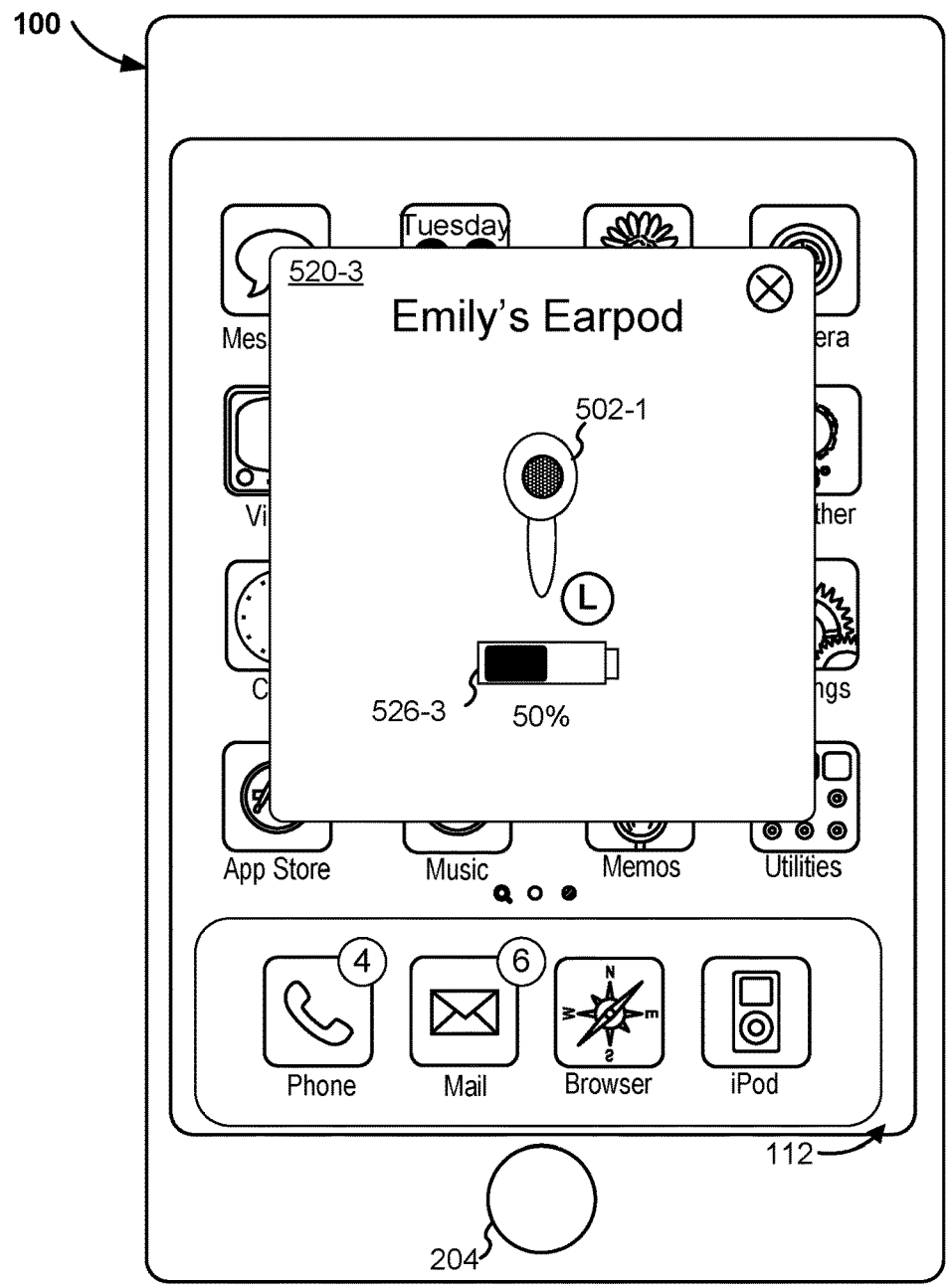

FIG. 5G illustrates an example user interface, displayed subsequent to the user interface in FIG. 5E, for displaying certain status information concerning a peripheral after the peripheral has previously paired with the device 100. In FIG. 5G, the device 100 detects a pairing request from earbud 502-1. After detecting the pairing request, the device 100 displays a window 520-3 overlaid on the user interface. The window 520-3 includes a battery level graphic 526-3 concerning the earbud 502-1. In this example, the earbud 502-1 is designated as user Emily's left earbud by a graphic (e.g., "L") displayed in the window 520-3. In other examples, an earbud can be designated as a right earbud by displaying another graphic (e.g., the "R" graphic shown for earbud 502-2 in FIG. 5H). Also, as shown, the battery level graphic 526-3 concerning the earbud 502-1 illustrates a battery level of "50%".

FIGS. 5H-5P illustrate example user interfaces, displayed subsequent to the user interface in FIG. 5E, for displaying certain information concerning two or more peripherals after at least one peripheral has paired with the device 100.

Figure 5H:
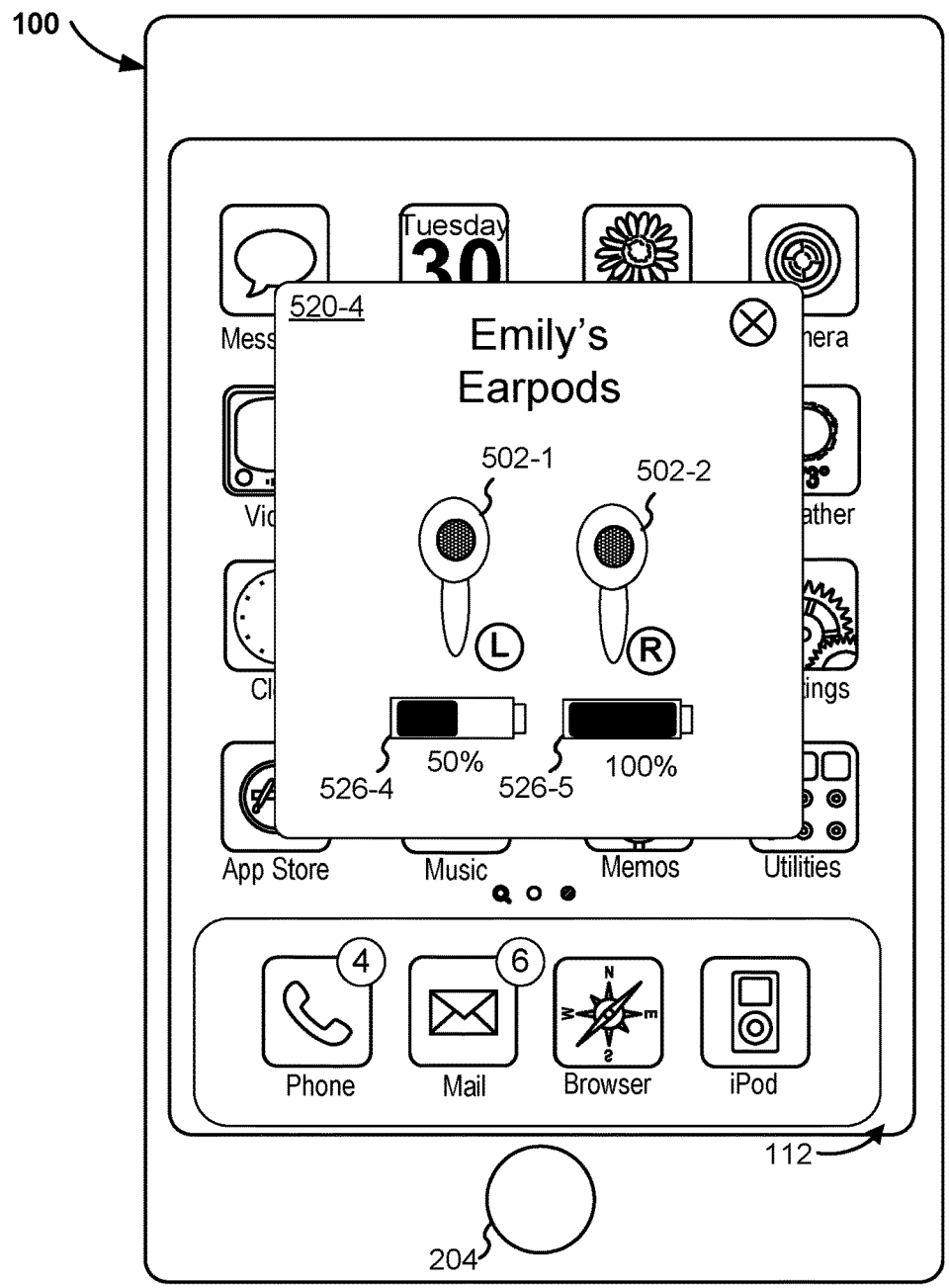

In FIG. 5H, the device 100 detects a pairing request from each of earbuds 502-1 and 502-2. After detecting the pairing requests, the device 100 determines that the earbuds 502-1 and 502-2 are part of a predefined set because, for example, both earbuds 502-1 and 502-2 have previously paired with the device 100 in a single pairing process. In response to determining that the earbuds 502-1 and 502-2 are part of a predefined set, the device 100 displays a window 520-4 overlaid on the user interface. The window 520-4 displays a battery level graphic 526-4 illustrating a battery level of "50%" for earbud 502-1 and a battery level graphic 526-5 illustrating a battery level of "100%" for earbud 502-2.

Figure 5I:
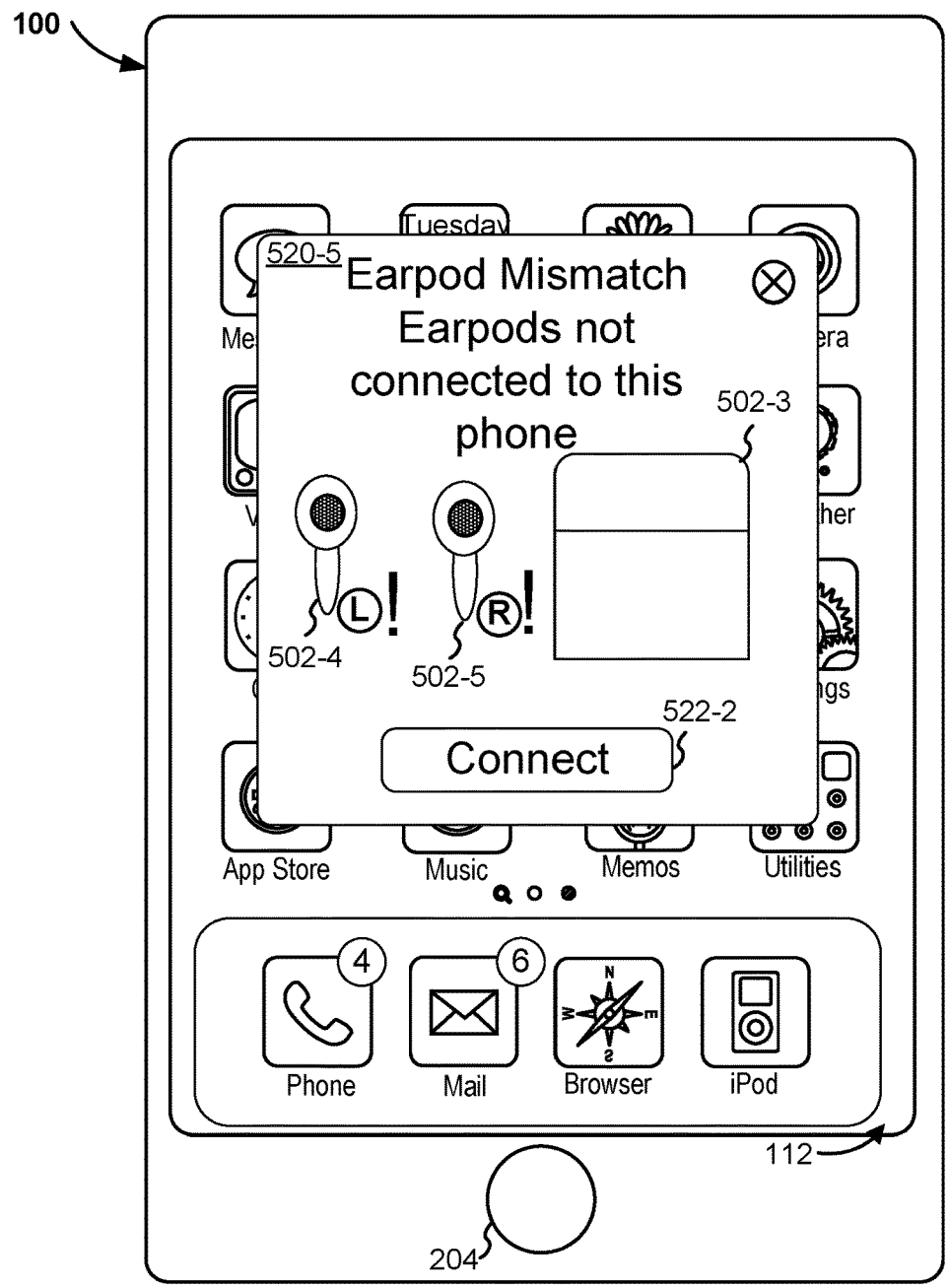
Figure 5I:
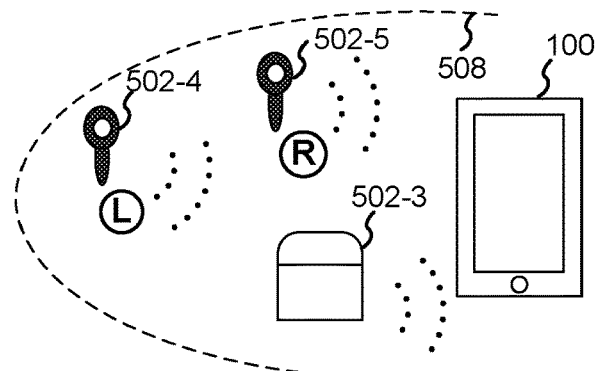

In FIG. 5I, the device 100 detects a pairing request from earbuds 502-4 and 502-5 as well as earbud case 502-3. Earbuds 502-4 and 502-5 are shown in thick black lines in the bottom of FIG. 5I to illustrate that these earbuds have not previously paired with the device 100 to form part of a predefined set. After detecting the pairing requests, the device 100 determines that the earbuds 502-4 and 502-5 are not part of a predefined set because, for example, both earbuds 502-4 and 502-5 have not been previously paired with the device 100. In response to determining that the earbuds 502-4 and 502-5 are not part of a predefined set, the device 100 displays a window 520-5 overlaid on the user interface. The window 520-5 includes information concerning a mismatch between the earbuds 502-4 and 502-5 and the earbud case 502-3 because the earbuds 502-4 and 502-5 have not previously paired with the device 100 (as illustrated by a graphic such as "!" appearing adjacent to each of earbuds 502-4 and 502-5), while earbud case 502-3 has previously paired with the device 100. The window 520-5 also includes a "Connect" button 522-2, that, when activated by a user input (e.g., a tap gesture), initiates pairing of the earbuds 502-4 and 502-5 with the device 100, in accordance with a determination that the earbuds 502-4 and 502-5 meet coupling criteria.

Figure 5J:
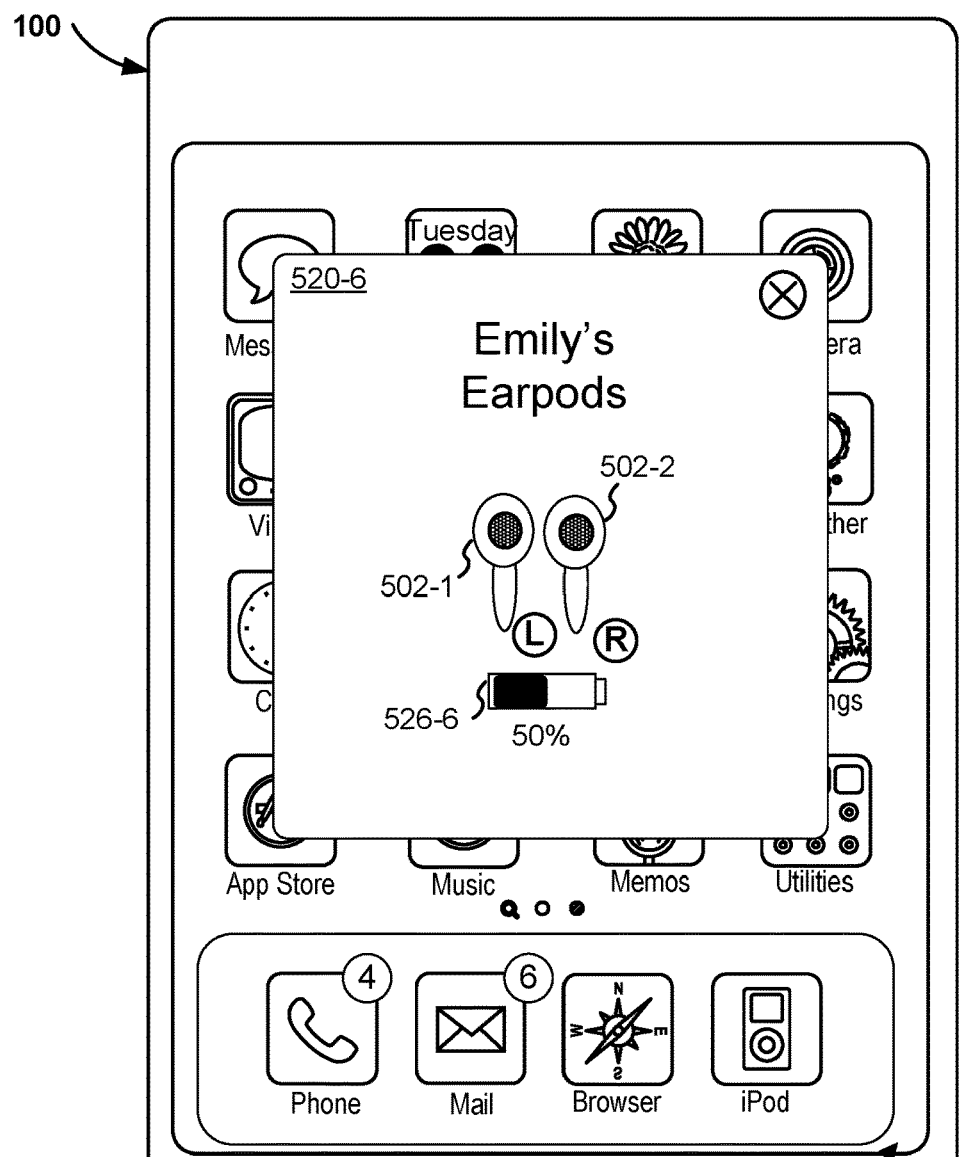
Figure 5K:
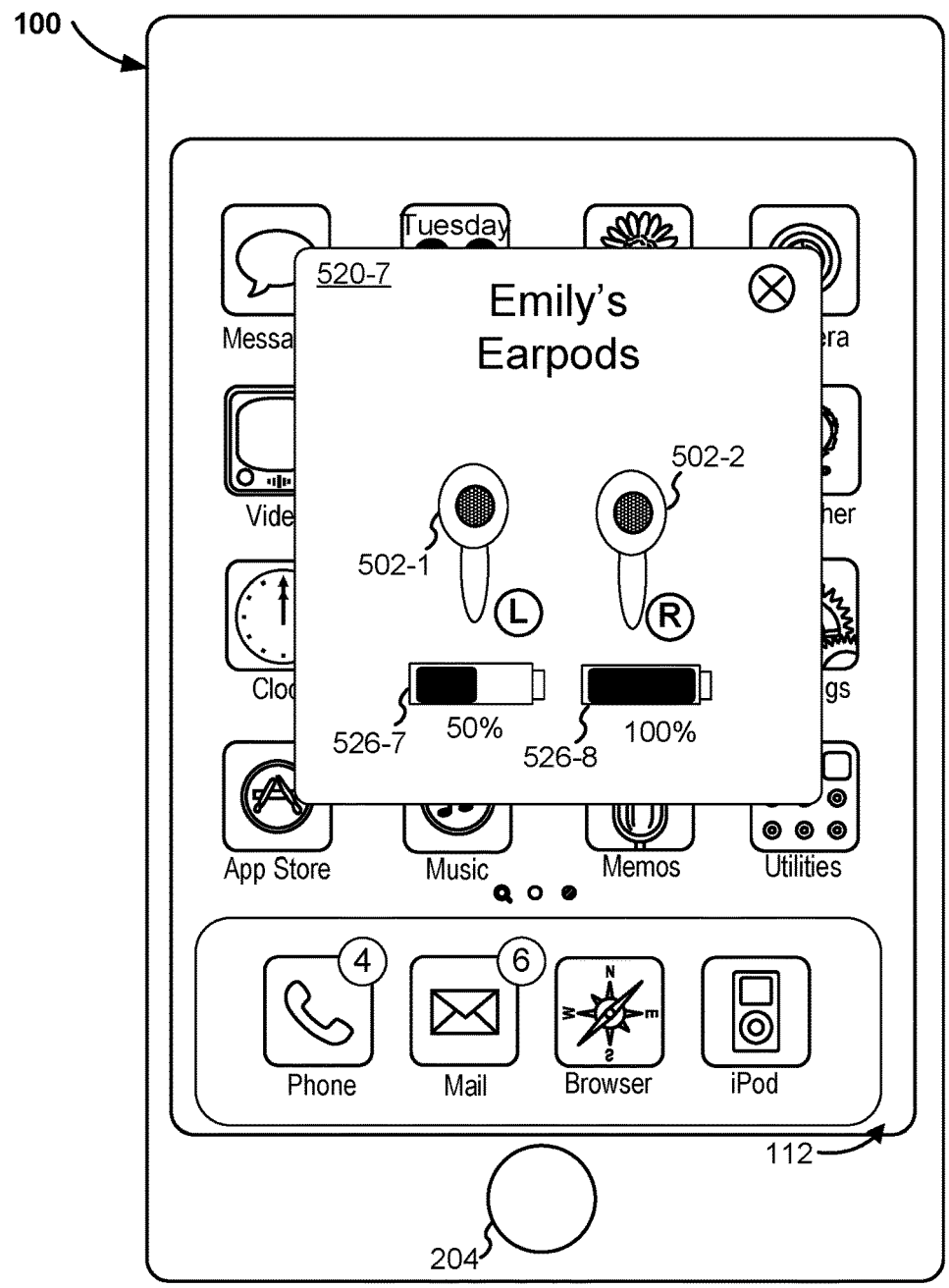
Figure 5K:
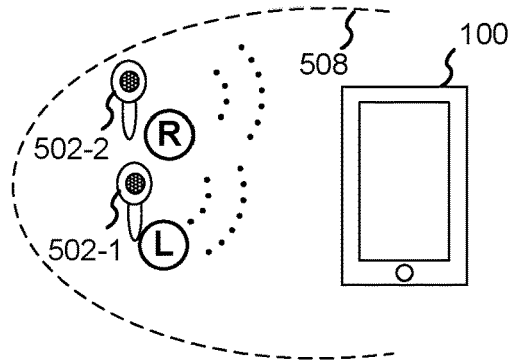

FIGS. 5J-5K illustrate example user interfaces, displayed subsequent to the user interface in FIG. 5E, for selectively displaying separate or combined status information for two or more peripherals based on status characteristics of the peripherals. In these examples, the device 100 detects a pairing request from each of earbuds 502-1 and 502-2. After detecting the pairing requests, the device 100 determines that the earbuds 502-1 and 502-2 are part of a predefined set because, for example, both earbuds 502-1 and 502-2 have previously paired with the device 100 in a single pairing process. In response to determining that the earbuds 502-1 and 502-2 are part of a predefined set, the device 100 determines whether a difference in battery level (which is an example of a status characteristic) between the earbud 502-1 and earbud 502-2 exceeds or does not exceed a predetermined threshold (e.g., 10%). If the device 100 determines that the difference does not exceed the predetermined threshold, as shown in FIG. 5J, the device 100 displays a window 520-6, overlaid on the user interface, that includes combined status information for both of the earbuds 502-1 and 502-2 (e.g., displaying a single battery level graphic 526-6 of 50% for earbuds 502-1 and 502-2) in the window 520-4. Conversely, if the device 100 determines that the difference exceeds the predetermined threshold, as shown in FIG. 5K, the device 100 displays a window 520-7, overlaid on the user interface, that includes separate status information for each of the earbuds 502-1 and 502-2 (e.g., displaying a battery level graphic 526-7 showing a battery level of 50% for earbud 502-1 and a separate battery level graphic 526-8 showing a battery level of 100% for earbud 502-2) in the window 520-5.

FIGS. 5L-5P illustrate alternative example user interfaces to the user interfaces displayed in FIGS. 5H-5K.

Figure 5L:
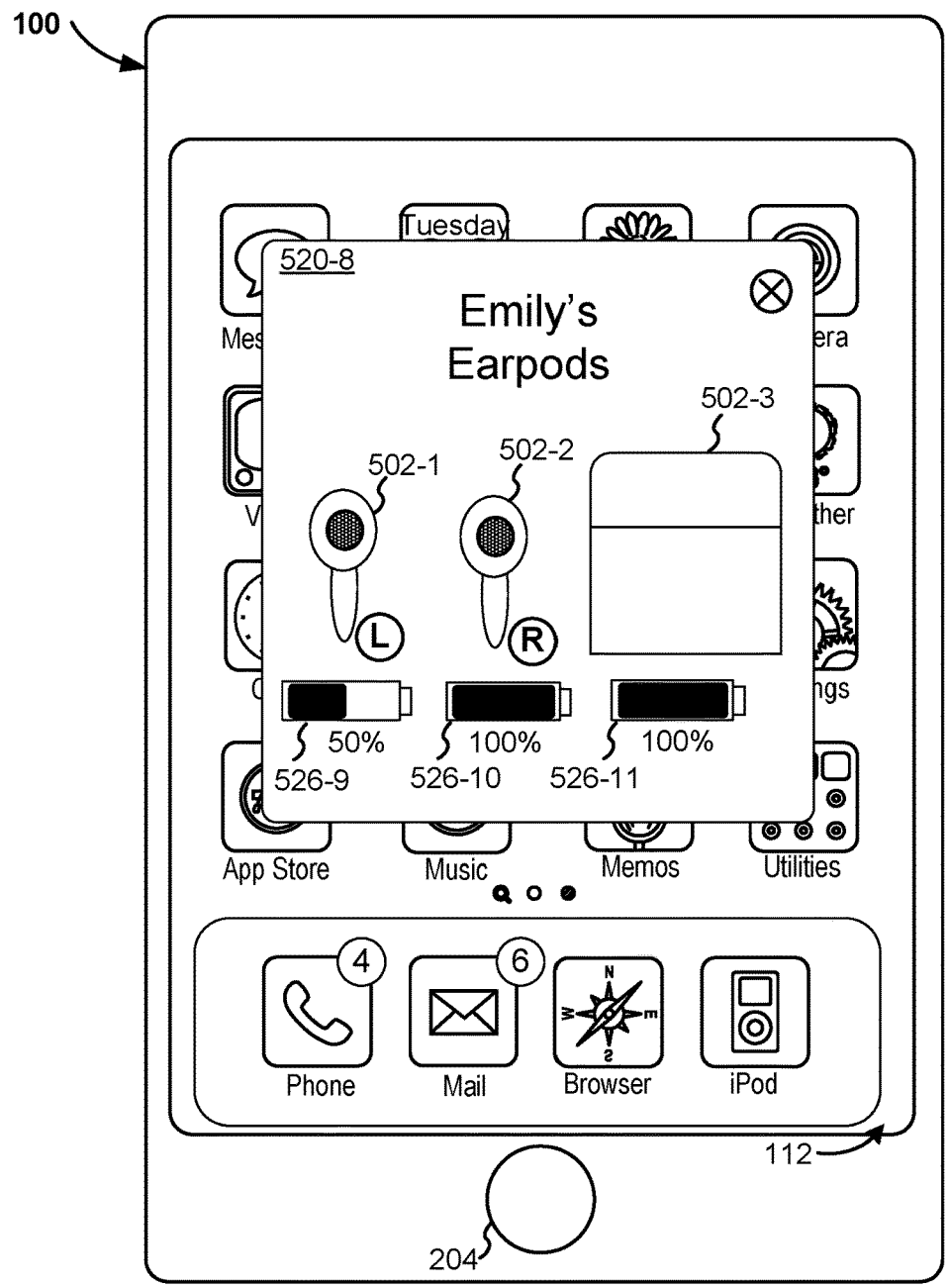

In FIG. 5L, after the device 100 detects a pairing request from at least one of earbuds 502-1 and 502-2 and earbud case 502-3 and determines that the earbuds 502-1 and 502-2 as well as earbud case 502-3 are part of a predefined set, the device 100 displays a window 520-8, overlaid on the user interface, that includes status information of each of the earbuds 502-1 and 502-2 and earbud case 502-3 (e.g., displaying a battery level graphic 526-9 illustrating a battery level of 50% for earbud 502-1, a battery level graphic 526-10 illustrating a battery level of 100% for earbud 502-2 and a battery level graphic 526-11 showing a battery level of 100% for earbud case 502-3) in the window 520-8.

Figure 5M:
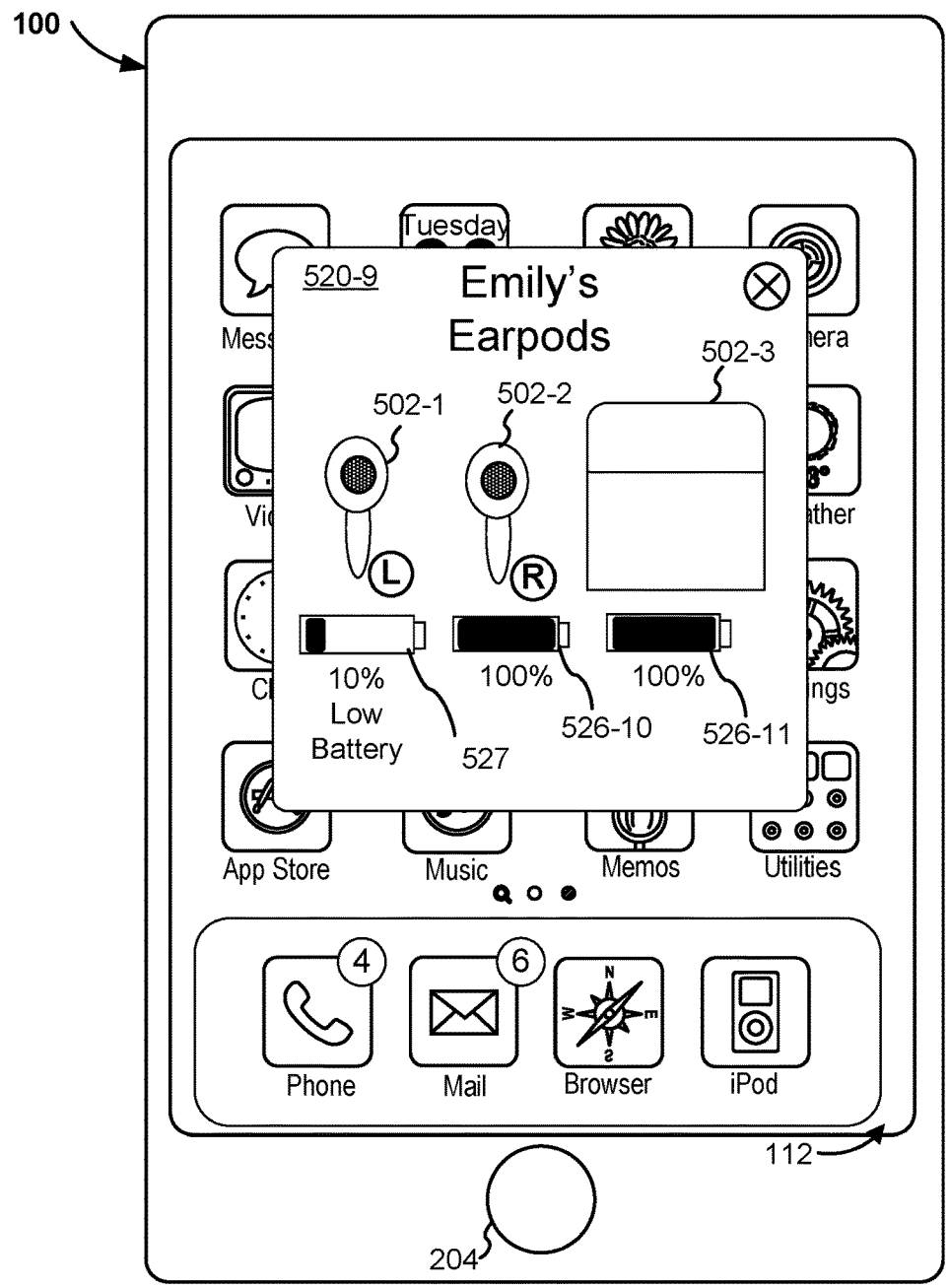
Figure 5M:
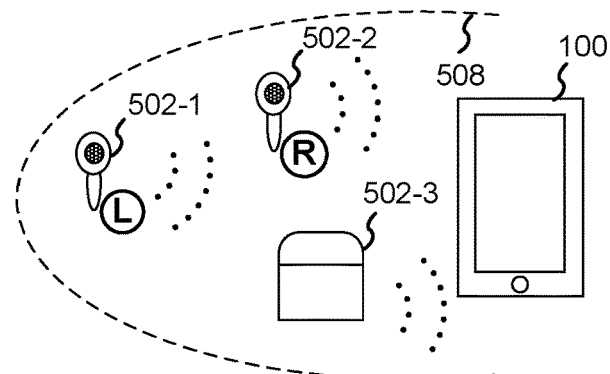

FIG. 5M is similar to FIG. 5L, except that device 100 determines that a battery level for earbud 502-1 falls below a minimum charge threshold. In response to determining that the battery level for earbud 502-1 falls below a minimum charge threshold, the device 100 displays a window 520-9, overlaid on the user interface, that includes a low battery graphic 527 as status information of the earbud 502-1.

Figure 5N:
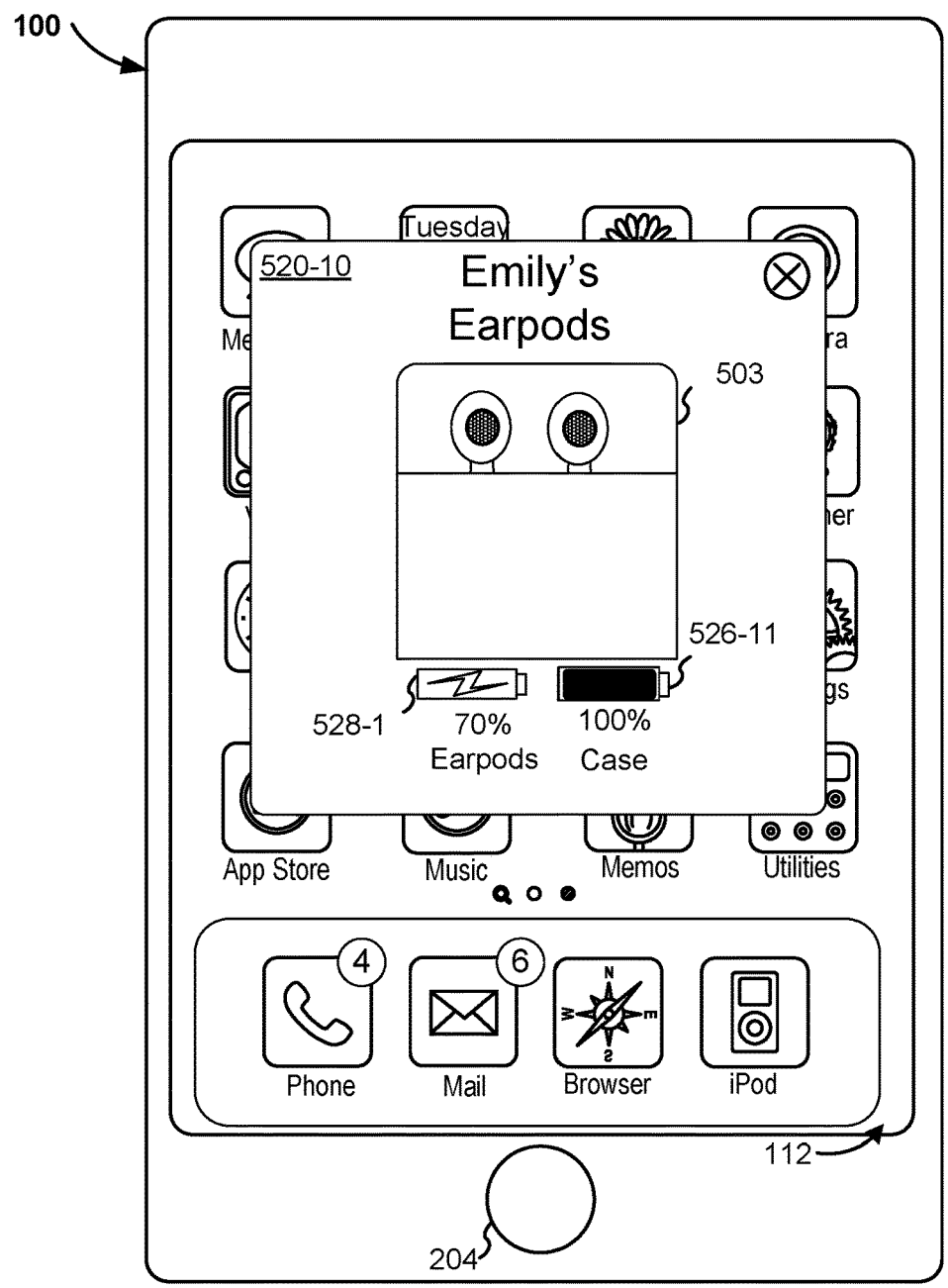

FIG. 5N is similar to FIG. 5M, except that device 100 determines that earbuds 502-1 and 502-2 of FIG. 5M are coupled to earbud case 502-3 (which includes a power source for the earbuds) of FIG. 5M to form earbud set 503. In response to determining that the earbuds 502-1 and 502-2 are coupled to a power source, the device 100 displays a window 520-10, overlaid on the user interface, that includes status information illustrating the earbuds 502-1 and 502-2 are charging (e.g., a charging battery graphic 528-1 illustrating that earbuds 502-1 and 502-2 are charging and a battery level graphic 526-11 showing a battery level of 100% for earbud case 502-3).

Figure 5O:
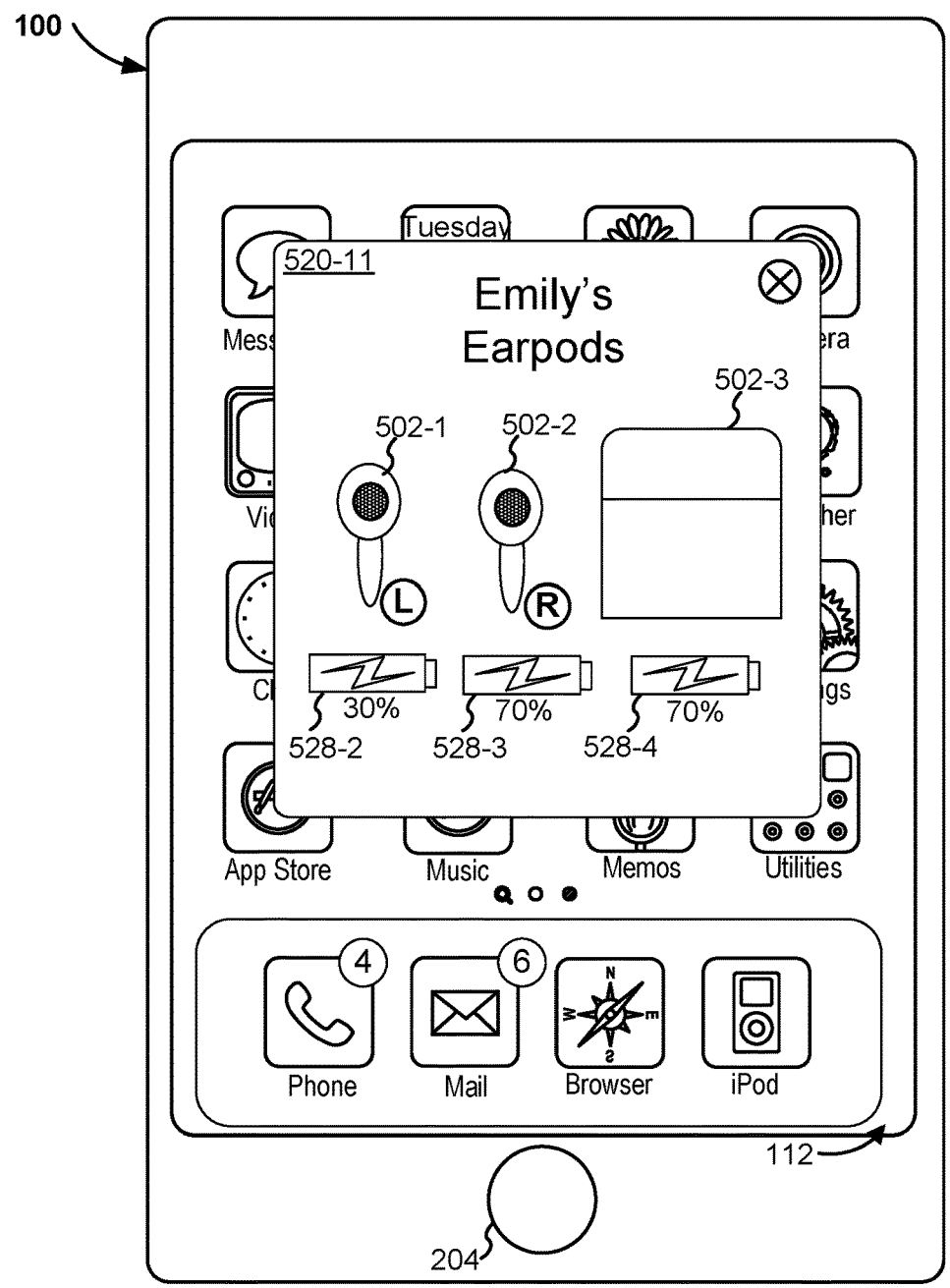
Figure 5O:
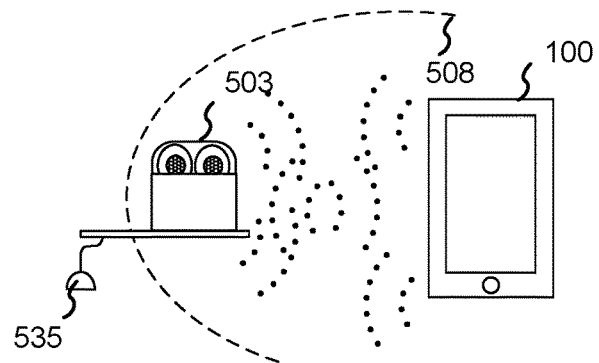

FIG. 5O is similar to FIG. 5N, except that device 100 determines that earbud set 503 is coupled to an external power source 535 (e.g., a wall outlet). In response to determining that earbud set 503 is coupled to an external power source 535, the device 100 displays a window 520-11, overlaid on the user interface, that includes status information illustrating the earbuds 502-1 and 502-2 as well as earbud case 502-3 are charging (e.g., displaying a charging battery graphic 528-2 illustrating that earbud 502-1 is charging and has a battery level of 30%, a charging battery graphic 528-3 illustrating that earbud 502-2 is charging and has a battery level of 70%, and a charging battery graphic 528-4 illustrating that earbud case 502-3 is charging and has a battery level of 70%).

Figure 5P:
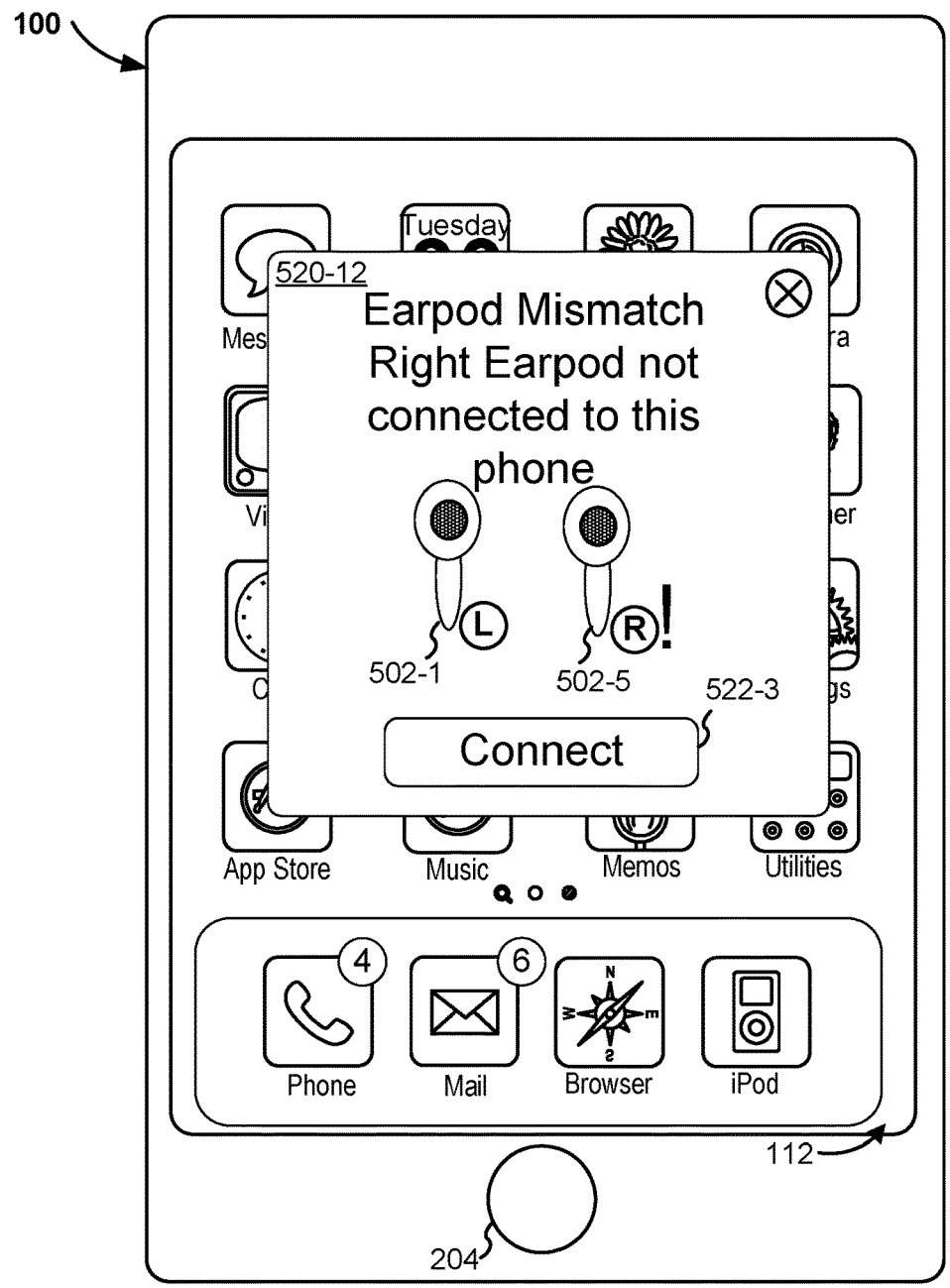
Figure 5P:
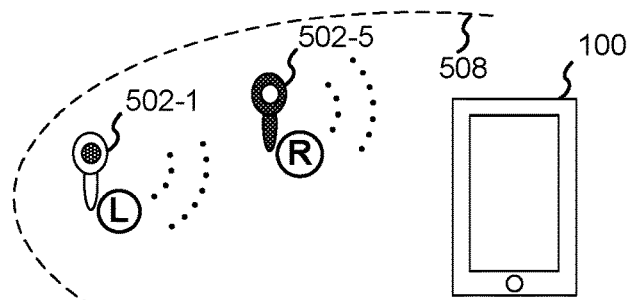

FIG. 5P is similar to FIG. 5I, except that earbud 502-1 has previously paired with device 100, while earbud 502-5 has not previously paired with device 100. After the device 100 detects a pairing request from earbuds 502-1 and 502-5 and determines that the earbuds 502-1 and 502-5 are not part of a predefined set, the device 100 displays a window 520-12 overlaid on the user interface. The window 520-12 includes information concerning a mismatch between the earbuds 502-1 and 502-5, indicating to the user that the earbuds 502-1 and 502-5 are not part of a predefined set and need to be paired before being used. The window 520-12 also includes a "Connect" button 522-3, that, when activated by a user input (e.g., a tap gesture), initiates pairing of the earbuds 502-1 and 502-5 with the device 100 to form a predefined set.

FIGS. 5Q-5Z illustrate example user interfaces for pairing an electronic device with one or more peripherals and subsequently displaying status information concerning the peripheral(s) while the electronic device is in a locked state, in accordance with some embodiments.

Figure 5Q:
Figure 5Q:
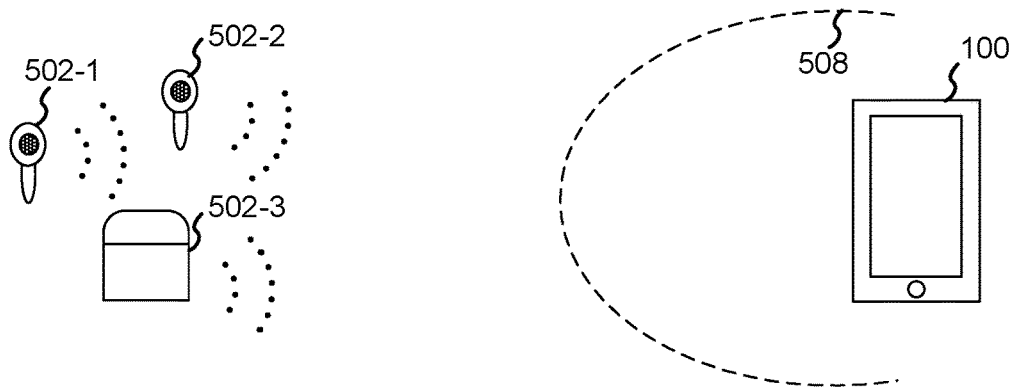

FIG. 5Q illustrates an example user interface on the display 112 of device 100 while the device 100 is in a locked state. In this example, while the device 100 is in the locked state, the example user interface is a lock screen. While displaying the lock screen, the device 100 repeatedly listens for pairing requests from peripherals, such as earbud 502-1, earbud 502-2 and earbud case 502-3, to pair the peripheral with the device 100. In this example, earbud 502-1, earbud 502-2 and earbud case 502-3 are outside of the threshold distance 508 of the device 100. Therefore, the device 100 cannot detect a pairing request from earbud 502-1, earbud 502-2 or earbud case 502-3.

Figure 5R:
Figure 5R:
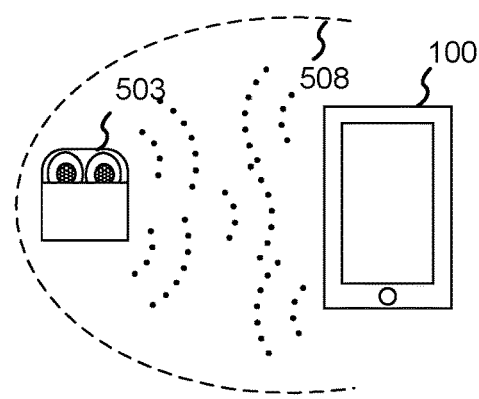

FIG. 5R illustrates an example user interface, displayed subsequent to the user interface in FIG. 5Q, for initiating pairing the device 100 with a peripheral (e.g. an earbud of earbud set 503). In FIG. 5R, the device 100 detects a pairing request from an earbud of earbud set 503, when the earbud set 503 is within the threshold distance 508. In response to detecting the pairing request from the earbud, the device 100 determines whether the earbud meets coupling criteria. In this example, the coupling criteria are met when the earbud is placed within and/or electrically coupled to an earbud case to form earbud set 503. After the device 100 determines that the earbud meets coupling criteria, the device 100 displays a window 520-13 overlaid on the first user interface that shows the earbud set 503, which is within the threshold distance 508 of the device 100. The window 520 also includes an "Unlock to Connect" button 522-4, that, when activated by a user input (e.g., a tap gesture), initiates pairing of the device 100 with the peripherals (e.g., earbuds 502-1 and 502-2 and earbud case 502-3 shown in FIG. 5Q) of earbud set 503.

Figure 5S:
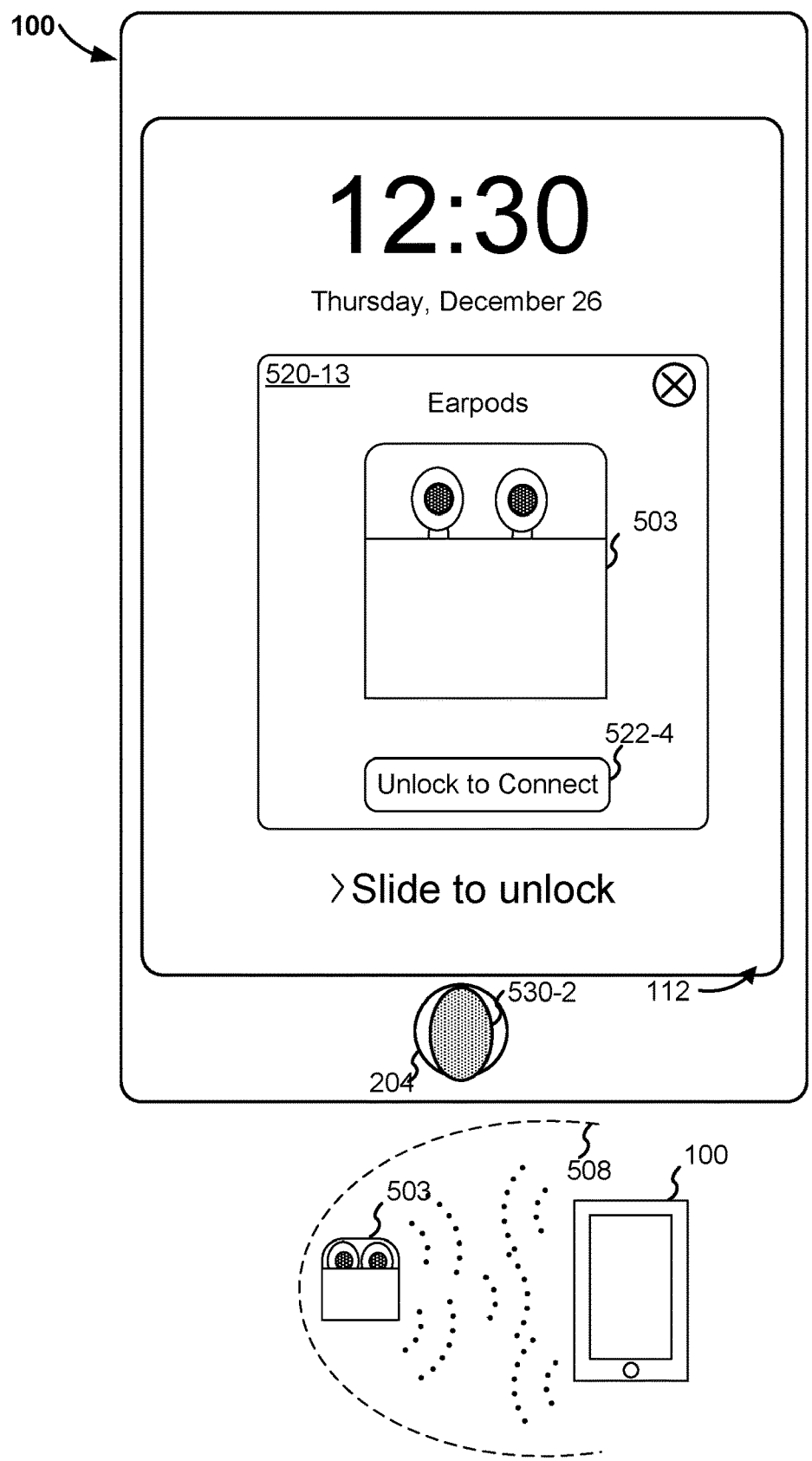
Figure 5T:
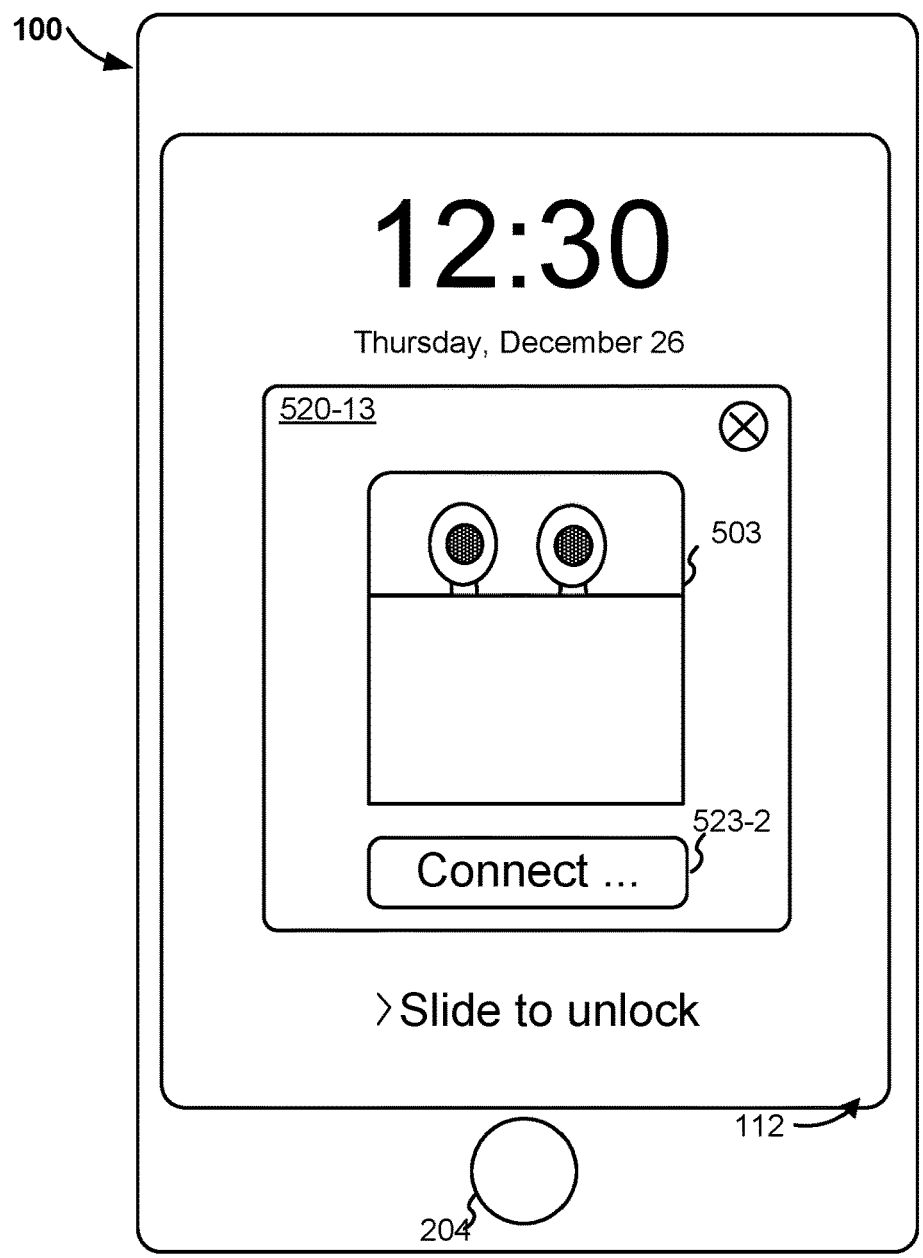
Figure 5T:
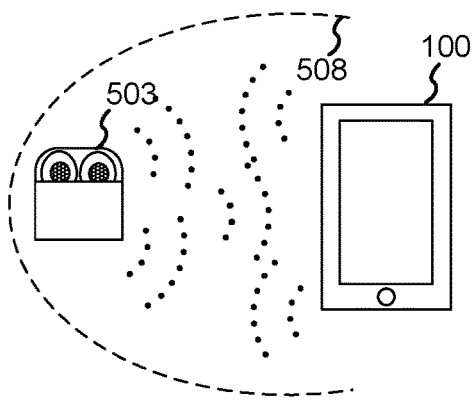
Figure 5U:
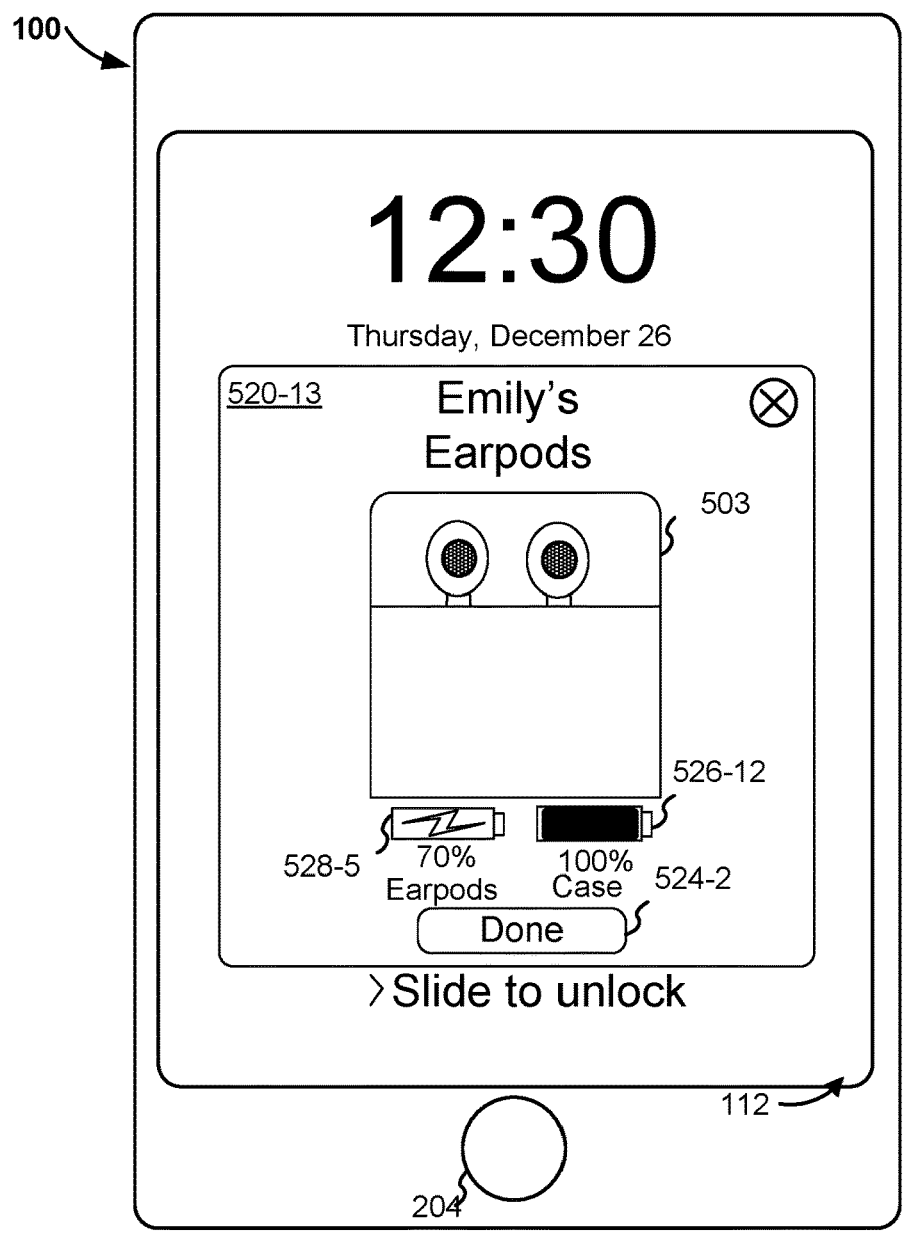
Figure 5U:
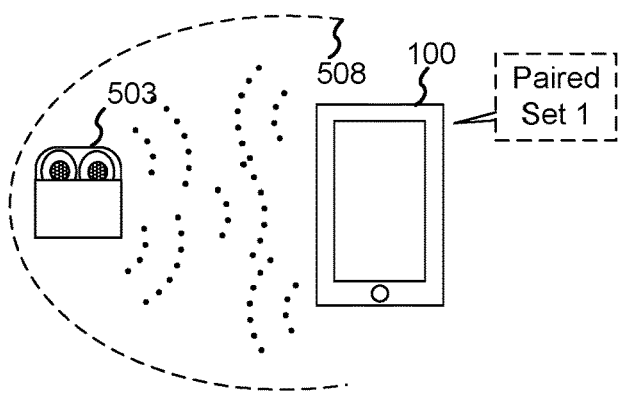

FIG. 5S-5U illustrate example user interfaces, displayed subsequent to the user interface in FIG. 5R, for initiating pairing the device 100 with a peripheral based on a first authentication input (e.g., a finger input on fingerprint sensor 204). In FIG. 5S, after the device 100 determines that the earbud 502-1 meets coupling criteria, the device 100 detects a touch input 530-2 on the fingerprint sensor 204 (e.g., a stationary press or tap). In response to detecting a valid user authentication input by touch input 530-2, the device 100 initiates pairing of the device 100 with the peripherals of earbud set 503. In FIG. 5T, while the device 100 is pairing the peripherals of earbud set 503, the device 100 displays a "Connect . . ." notification graphic 523-2 in window 520-13. In FIG. 5U, after the device 100 pairs with the earbud 502-1, earbud 502-2 and earbud case 502-3, the device 100 displays status information (e.g., a charging battery graphic 528-5 illustrating that earbuds 502-1 and 502-2 are charging and a battery level graphic 526-12 showing a battery level of 100% for earbud case 502-3) in window 520-13. The device 100 also displays a "Done" button 524-2 that, when activated by a user input, such as a tap gesture, ceases display of the window 520-13 and allows the user to perform other operations on device 100.

Figure 5V:
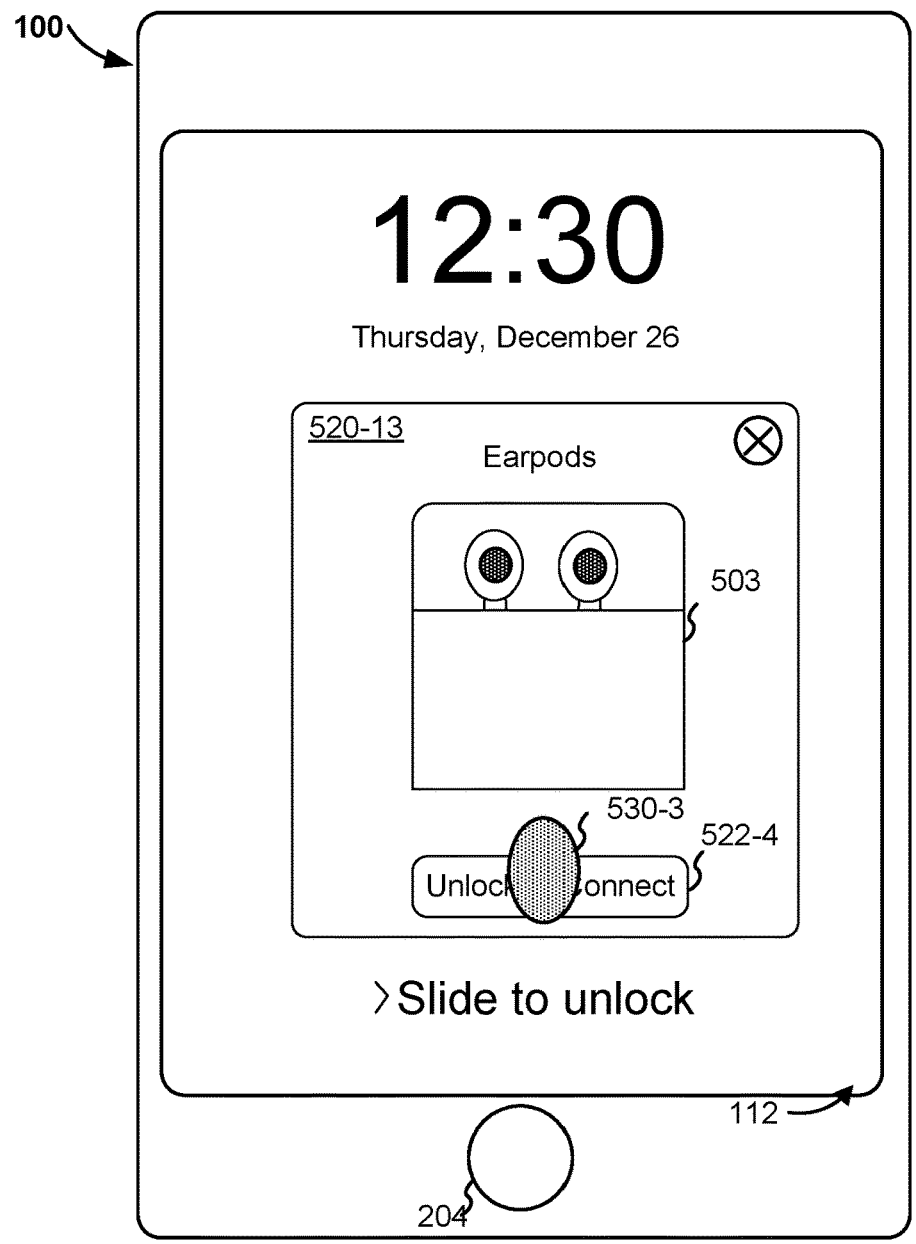
Figure 5V:
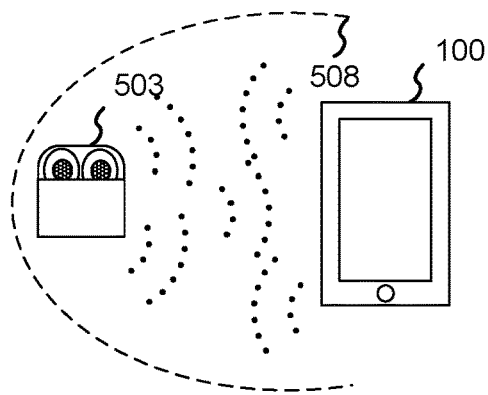
Figure 5W:
Figure 5W:
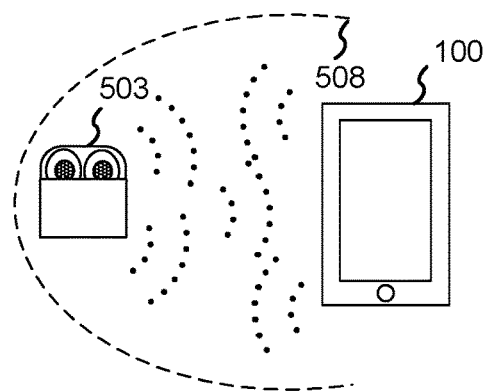
Figure 5X:
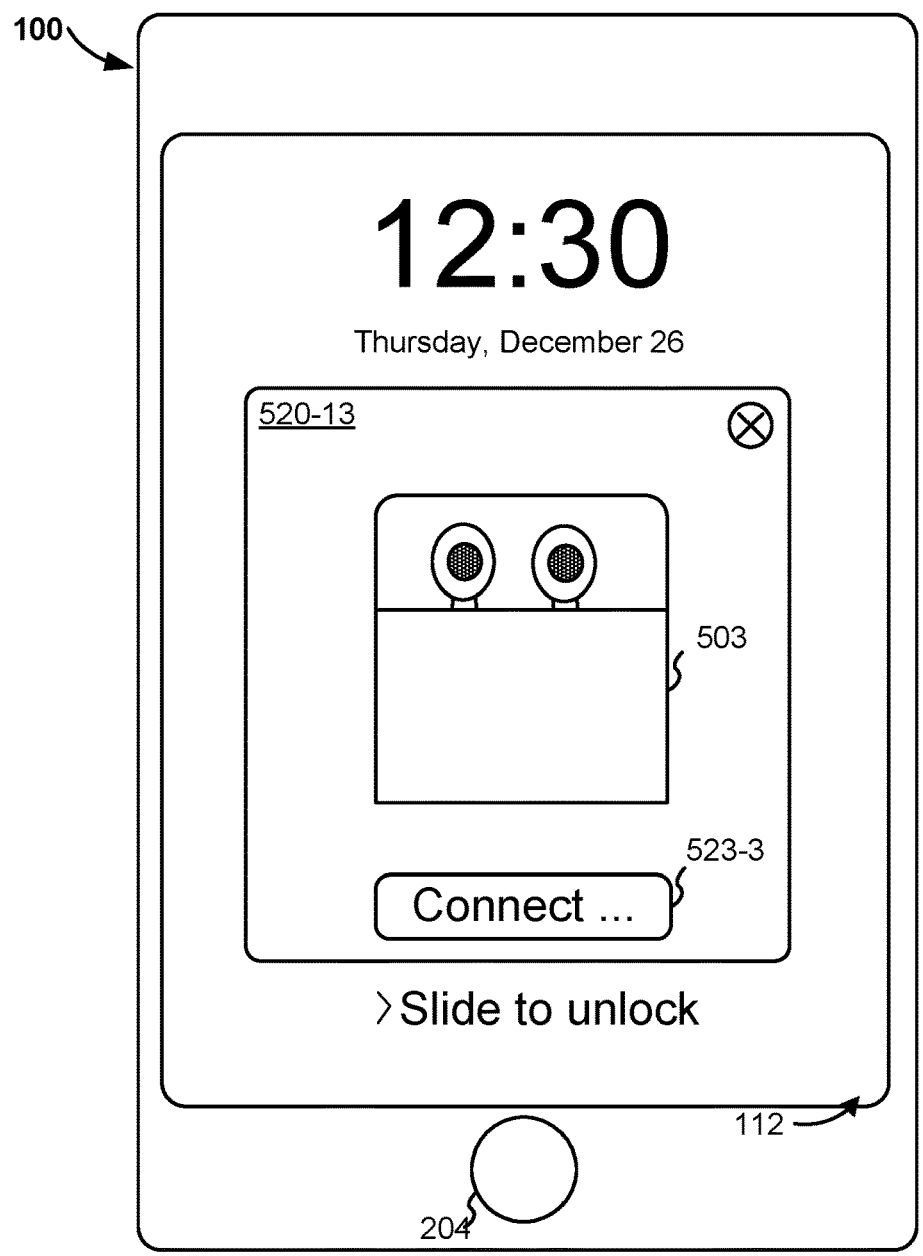
Figure 5X:
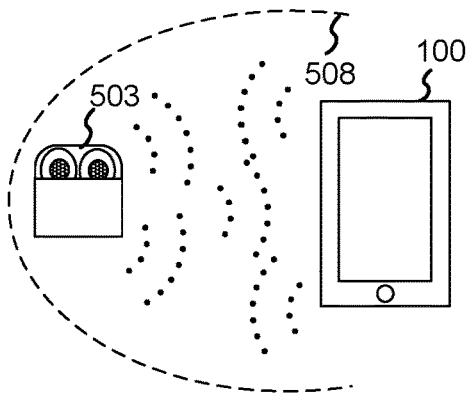
Figure 5Y:
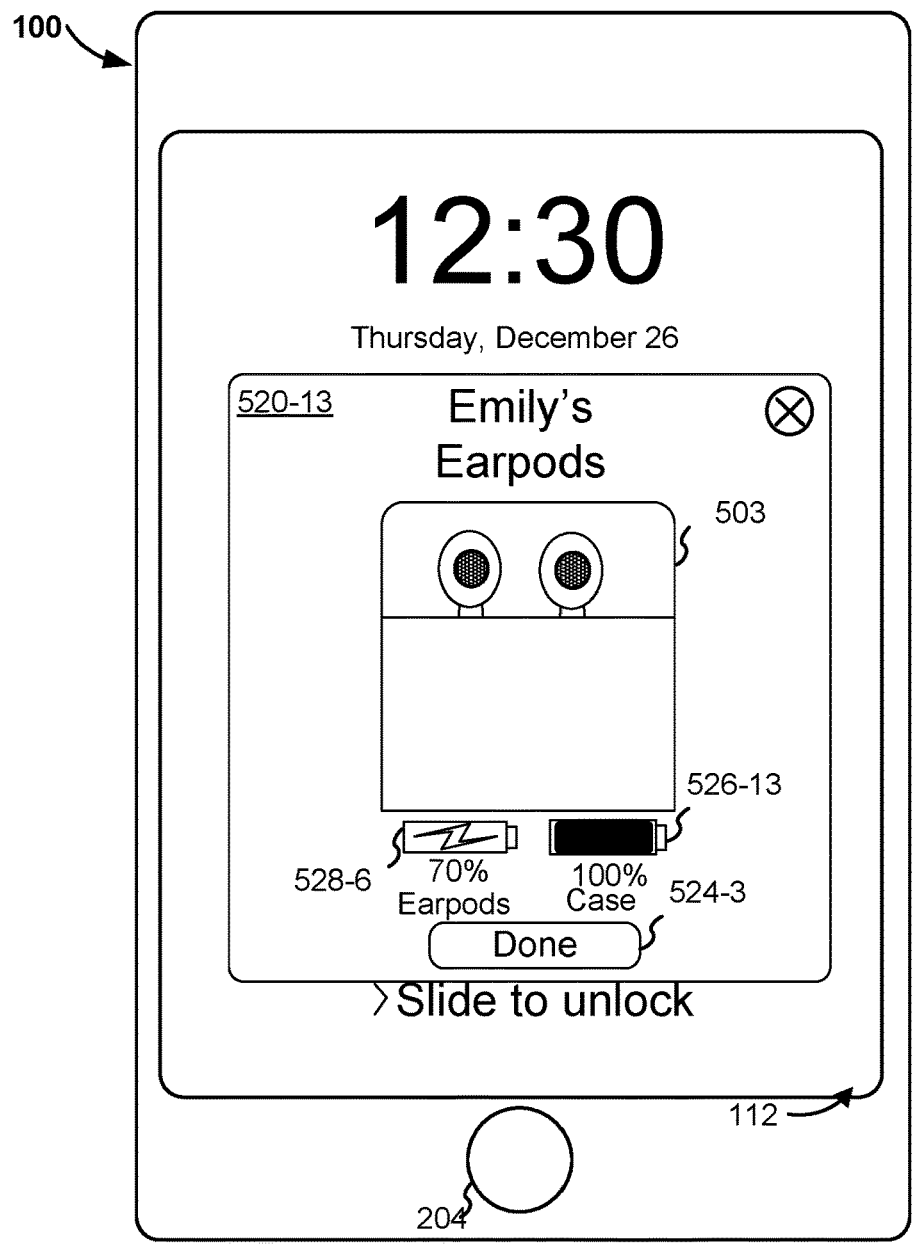
Figure 5Y:
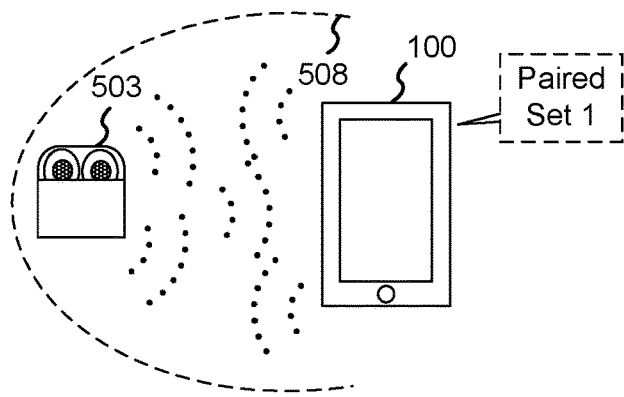

FIGS. 5V-5Y illustrate example user interfaces, displayed subsequent to the user interface in FIG. 5R, for initiating pairing of the device 100 with a peripheral (e.g., an earbud of earbud set 503) based on a second authentication input (e.g., a passcode typed on a keypad). In FIG. 5V, after the device 100 determines that the earbud of earbud set 503 meets coupling criteria, the device 100 detects a tap gesture 530-3 on the "Unlock to Connect" button 522-4. In FIG. 5W, in response to detecting the tap gesture 530-3, the device 100 displays a user interface that includes a keypad 536 for authenticating the user. In this example, the keypad 536 is a numerical keypad having unique numerical inputs 537-1 to 537-9 that correspond to numerical values one (1) through nine (9), respectively. The device 100 then detects a user authentication input by a tap gesture 530-4 (e.g., a tap gesture) on one or more of the numerical inputs 537-1 to 537-9. In response to the device 100 detecting a valid authentication input, the device 100 initiates pairing of the device 100 with the peripherals of earbud set 503. In FIG. 5X, while the device 100 is pairing with the earbud set 503, the device 100 displays a "Connect . . ." notification graphic 523-3 in window 520-13. In addition, while the device 100 is pairing, the device 100 maintains display of the lock screen and continues to operate in a locked state. In FIG. 5Y, as similarly shown in FIG. 5U, after the device 100 pairs with the peripherals of earbud set 503, the device 100 displays status information (e.g., displaying a charging battery graphic 528-6 illustrating that earbuds 502-1 and 502-2 of earbud set 503 are charging and a battery level graphic 526-13 showing a battery level of 100% for earbud case 502-3 of earbud set 503) in window 520-13. The device 100 also displays a "Done" button 524-2 that, when activated by a user input, such as a tap gesture, ceases display of the window 520-13 and allows the user to perform other operations on device 100.

FIG. 5Z illustrates an example user interface, displayed subsequent to the user interfaces in FIG. 5Y or 5U, for displaying certain status information concerning a peripheral after the peripheral has previously paired with the device 100. In FIG. 5Z, the device 100 detects a pairing request from earbud 502-1 and earbud 502-2. After detecting the pairing request, the device 100 displays a window 520-14 overlaid on the user interface. The window 520-14 includes battery level graphic 526-14 (which is an example of status information) concerning the earbud 502-1 and the earbud 502-2. As shown, the battery level graphic 526-14 concerning the earbuds 502-1 and 502-2 illustrates a battery level of "50%".

FIGS. 6A-6C are flow diagrams illustrating a method 600 of pairing an electronic device with peripheral devices and displaying status information concerning the peripheral devices in accordance with some embodiments. The method 600 is performed at an electronic device (e.g., device 300, FIG. 3, or portable multifunction device 100, FIG. 1A) with a display, a radio frequency (RF) circuitry for wirelessly communicating with one or more peripheral devices, and one or more input devices (e.g., a touch-sensitive surface) for receiving inputs from a user. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an intuitive way to pair peripherals with a device and display status information for the peripherals. The method reduces the number, extent, and/or nature of the inputs from a user when pairing peripherals with the device and displaying status information for the peripherals, thereby creating a more efficient human-machine interface. For battery-operated electronic devices, enabling a user to pair peripherals with the device and display status information faster and more efficiently conserves power and increases the time between battery charges.

The device displays (602) a first user interface (e.g., a home screen, a user interface of an application, a wake screen, a lock screen, etc.) on the display.

While displaying the first user interface, the device detects (604) a pairing request to pair a first peripheral (e.g., earbuds 502-1 and 502-2, an earbud case 502-3, etc.) with the electronic device. In some embodiments, the pairing request is detected when a user touches the electronic device with one or both of the earbuds or with the case of the earbuds, or brings the electronic device and the earbuds within a threshold distance of each other. In some embodiments, the electronic device detects the presence and proximity of the earbud(s) or the case of the earbuds through wireless signals (e.g., broadcast Bluetooth signals, or a Bluetooth pairing request) emitted by the earbud(s) or the case of the earbuds. In some embodiments, the electronic device detects the presence and proximity of the earbud(s) or the case of the earbuds through other proximity sensing mechanisms (e.g., other RF signals sensing mechanisms) embedded in the electronic device and the earbuds and/or the case of the earbuds.

In some embodiments, detecting the pairing request to pair the first peripheral with the electronic device includes (606) detecting wireless signals transmitted from the first peripheral device and determining that the first peripheral device satisfies proximity criteria based on the detected wireless signals. In some embodiments, proximity criteria includes a criterion that is met when a signal strength of a wireless signal from the first peripheral exceeds a signal strength threshold. In some embodiments, proximity criteria includes a criterion that is met when the electronic device and the earbuds are within a threshold distance of each other. For example, as shown in FIG. 5F, a first peripheral (e.g., earbud 502-1) is within a threshold distance 508 of electronic device 100.

In response to detecting the pairing request, the device determines (608) whether the first peripheral meets coupling criteria, wherein the coupling criteria require that the first peripheral is coupled (e.g., electrically, magnetically, and/or wirelessly) to a second peripheral. The second peripheral is distinct from the electronic device, and both the first and the second peripherals are peripheral to the electronic device. In some embodiments, the first peripheral is an earbud (e.g., earbud 502-1) and the second peripheral is an earbud case (e.g., earbud case 502-3) for storing and charging the first earbud, as shown in FIG. 5B (as part of earbud set 503); and the coupling criteria require that the earbud and the case are in proximity to each other (e.g., the earbud is in the case and optionally electrically connected to the case) and to the electronic device. In some embodiments, the first peripheral is an earbud (e.g., earbud 502-1) and the second peripheral is a second earbud (e.g., earbud 502-2); and the coupling criteria require that the first earbud and the second earbud be coupled to each other through the case (e.g., earbud case 502-3). For example, both earbuds are electrically connected to the case (e.g., when placed inside the case with the lid closed). In some embodiments, the first peripheral is a first earbud and the second peripheral is a second earbud, the coupling criteria require that the first earbud and the second earbud are in proximity to each other and to the device (e.g., both the first and second earbuds are stored in the earbud case or placed near each other without the case). In some embodiments, the first peripheral is the case of the earbud and the second peripheral is an earbud or both of the earbuds; and the coupling criteria require that the earbud(s) and the case are coupled to each other or are placed in proximity to each other and to the device.

In some embodiments, the coupling criteria include (610) a criterion that is met when the first peripheral is coupled (e.g., electrically, magnetically, and/or wirelessly) to a third peripheral, distinct from the second peripheral. In some embodiments, the first peripheral is an earbud, the second peripheral is another earbud, the third peripheral is a case of the earbud, and the coupling criteria require that the first earbud and the second earbud be electrically coupled to each other through the earbud case. For example, as shown in FIG. 5B, earbud 502-1, earbud 502-2 and earbud case 502-3 are all coupled to form earbud set 503.

In some embodiments, the first peripheral is (612) one or more earbuds and the second peripheral is a case for the one or more earbuds.

In some embodiments, the coupling criteria include (614) a criterion that is met when the one or more earbuds are at least one of: inside the case, and electrically coupled to the case. In some embodiments, as shown in FIG. 5B, earbuds 502-1 and 502-2 are inside of, and electrically coupled to, earbud case 502-3 to form earbud set 503. In some embodiments, the coupling criteria include an additional criterion that is met when the lid of the case is closed.

In accordance with a determination that the first peripheral meets the coupling criteria, the device displays (616) a pairing affordance (e.g., a button or other icon (e.g., "Connect" button 522-1) in a window (e.g., window 520-1) overlaid on the first user interface, as shown in FIG. 5B) that, when activated by a user input, initiates pairing of the electronic device with the first peripheral In some embodiments, the pairing affordance, when activated by the user input, also initiates pairing with the second peripheral (and any other peripherals that are coupled to the first and/or second peripheral).

In accordance with a determination that the first peripheral does not meet the coupling criteria, the device displays (618) information concerning coupling of the first peripheral and the second peripheral (e.g., the graphical display in window 520-2, as shown in FIG. 5F).

Selectively pairing related peripherals, such as when the peripherals are coupled to other peripherals, provides the user with the capability to synchronize pairing between multiple peripherals in response to a single pairing action. Providing improved pairing functionality to the user enhances the operability of the device and makes the user-device interface more efficient (e.g., by helping the user to efficiently pair a given device with multiple related peripherals in response to a single action, thereby reducing user mistakes when attempting to pair a given device to multiple related peripherals). Without this improved pairing process, the user would have to take additional steps to get the device to individually pair with different peripherals to achieve the same functionality as described herein. Individually pairing a device with multiple peripherals can be a time-consuming process, and the user is more prone to making mistakes due to the increased number of user inputs required to complete the pairing process.

In some embodiments, after the electronic device is paired with the first peripheral, the device displays (620) status information (e.g., model, manufacturer, icon, color, and/or battery level) concerning the first peripheral and the second peripheral in a second user interface. For example, as shown in FIG. 5H, the first peripheral is earbud 502-1, the second peripheral is earbud 502-2 and the second user interface is window 520-4. Window 520-4 displays battery level graphic 526-4 for earbud 502-1 and battery level graphic 526-5 for earbud 502-2.

Displaying status information concerning peripherals, after the peripherals pair with the device, provides the user with information concerning the peripherals (e.g., one or more battery levels) when the peripherals are proximate to the device. Providing status information of the peripherals enhances the operability of the device and makes the user-device interface more efficient (e.g., by providing access to information concerning the peripherals without the user having to physically inspect each peripheral), thereby enabling the user to use the device and peripherals more quickly and efficiently.

In some embodiments, after pairing of the electronic device with the first peripheral, the device determines (622) whether the second peripheral and the first peripheral are part of a predefined set of associated peripherals that have been previously paired with the electronic device. For example, when the electronic device has been previously paired with a set of earbuds and their case in a single pairing process (e.g., as illustrated in FIGS. 5C-5E), the electronic device stores a pairing profile that defines the set of earbuds and their case as a set of associated peripherals. In some embodiments, if one set of associated peripherals includes two earbuds and a case, and another set of associated peripherals includes a set of speakers, the speakers and the earbuds do not belong to the same set of associated peripherals, because they were not paired with the electronic device in a single pairing process. In some embodiments, the first and second peripherals are part of a predefined set when the first and second peripherals have been previously paired to the electronic device in a single pairing process. In accordance with a determination that the second peripheral and the first peripheral are part of a predefined set of associated peripherals that have been previously paired with the electronic device, the device displays status information (e.g., model, manufacturer, icon, color, and/or battery level) concerning the first peripheral and the second peripheral (e.g., as illustrated in FIGS. 5H and 5J-5O). In some embodiments, corresponding graphics may be displayed to illustrate a peripheral heuristic (e.g., a graphic showing the case lid open). In accordance with a determination that the second peripheral and the first peripheral are not part of a predefined set of associated peripherals that have been previously paired with the electronic device, the device displays information concerning a mismatch between the first peripheral and the second peripheral (e.g., as illustrated in FIGS. 5I and 5P).

Displaying information concerning whether two or more peripherals have been previously paired with a device during a single pairing process, and therefore form a set of associated peripherals, provides the user with the capability to quickly discern whether the peripherals are available for immediate use, or whether the peripherals need to be paired together before use. Providing improved pairing functionality of multiple peripherals to a given device enhances the operability of the device and makes the user-device interface more efficient (e.g., by helping the user to quickly understand when peripherals are available for use or, alternatively, when the peripherals need to be paired together with the device before use). Without this information, the user might mistakenly attempt to use peripherals that are not part of a predetermined set (e.g., by using one or more unpaired earbuds and trying to stream media content from the device to the earbuds), and subsequently discover that at least one of the peripherals is inoperable with the device.

In some embodiments, displaying information concerning the mismatch between the first peripheral and the second peripheral includes (624) displaying a second pairing affordance (e.g., a button or other icon (e.g., "Connect" button 522-2) in a window (e.g., window 520-5) overlaid on the first user interface, as shown in FIG. 5I) that, when activated by a user input, initiates pairing of the electronic device with the second peripheral. In some embodiments, the second pairing affordance, when activated by the user input, also initiates pairing with any other peripherals that are coupled to the first and/or second peripheral.

In some embodiments, displaying the status information (e.g., model, manufacturer, icon, color, and/or battery level) concerning the first peripheral and the second peripheral includes (626) displaying a single combined peripheral status characteristic (e.g., a combined battery level) concerning the first peripheral and the second peripheral in accordance with a determination that a difference between a first peripheral status characteristic (e.g., battery level) of the first peripheral and a second peripheral status characteristic (e.g., battery level) of the second peripheral is less than a predetermined threshold and the first peripheral and the second peripheral are the same type of peripheral (e.g., earbuds) (e.g., as shown in FIGS. 5H and 5N.). In some embodiments, the predetermined threshold is a numerical difference of 5%, 10%, 15%, or 20%.

In some embodiments, displaying status information (e.g., model, manufacturer, icon, color, and/or battery level) concerning the first peripheral and the second peripheral includes (628) displaying a first peripheral status characteristic (e.g., battery level of the first peripheral) concerning the first peripheral and displaying a second peripheral status characteristic (e.g., battery level of the second peripheral) concerning the second peripheral in accordance with a determination that a difference between the first peripheral status characteristic (e.g., battery level) of the first peripheral and the second peripheral status characteristic (e.g., battery level) of the second peripheral is greater than a predetermined threshold and the first peripheral and the second peripheral are the same type of peripheral (e.g., earbuds) (e.g., as shown in FIG. 5L). In some embodiments, the predetermined threshold difference is 5%, 10%, 15%, or 20%.

In some embodiments, displaying the status information of the first peripheral includes (630) displaying a low battery graphic in accordance with a determination that a battery level concerning the first peripheral falls below a minimum charge threshold (e.g., as shown in FIG. 5M). In some embodiments, the minimum charge threshold is 10%, 15%, or 20%.

In some embodiments, displaying the status information of the first peripheral includes (632) displaying a charging battery graphic in accordance with a determination that a first peripheral is connected to a power source (e.g., as shown in FIGS. 5N-5O). In some embodiments, the power source is a battery or a wall outlet. In some embodiments, the first peripheral is an earbud and the power source is integrated in the second peripheral (e.g., a case).

In some embodiments, the electronic device is (634) in a locked state while displaying the first user interface (e.g., a lock screen, a wake screen for a locked state, etc. as shown in FIGS. 5Q-5Y). After activating the pairing affordance (e.g., "Connect" button 522-3 in window 520-12 of FIG. 5V), the device presents a request (e.g., on the display and/or aurally) for an authentication input (e.g., displaying a passcode keypad 536 as shown in FIG. 5W) from a user to pair the first peripheral with the electronic device. The device receives the authentication input from the user. In some embodiments, the received authentication input is the same input as an authentication input that unlocks the electronic device (e.g., fingerprint scan, passcode, slide gesture, etc.). In response to receiving the authentication input: the device pairs the first peripheral with the electronic device (e.g., as shown in FIGS. 5X-5Y) and maintains the electronic device in the locked state.

Providing pairing functionality between the device and the peripheral, while the device is in a locked state, enhances the operability of the device and makes the user-device interface more efficient by reducing the number of user inputs required to pair the device with the peripheral, thereby reducing user mistakes when operating/interacting with the device.

In some embodiments, the device maintains (636) display of the first user interface associated with the locked state of the electronic device while pairing the first peripheral with the electronic device.

In some embodiments, the device maintains (638) display of the first user interface associated with the locked state of the electronic device after pairing the first peripheral with the electronic device is completed.

In some embodiments, while maintaining display of the first user interface associated with the locked state of the electronic device after pairing the first peripheral with the electronic device is completed, the device displays (640) status information concerning the first peripheral (e.g., single earbud case, mismatch case, battery status cases, etc.) (e.g., as shown in window 520-13 of FIG. 5Z).

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein.

Figure 7:
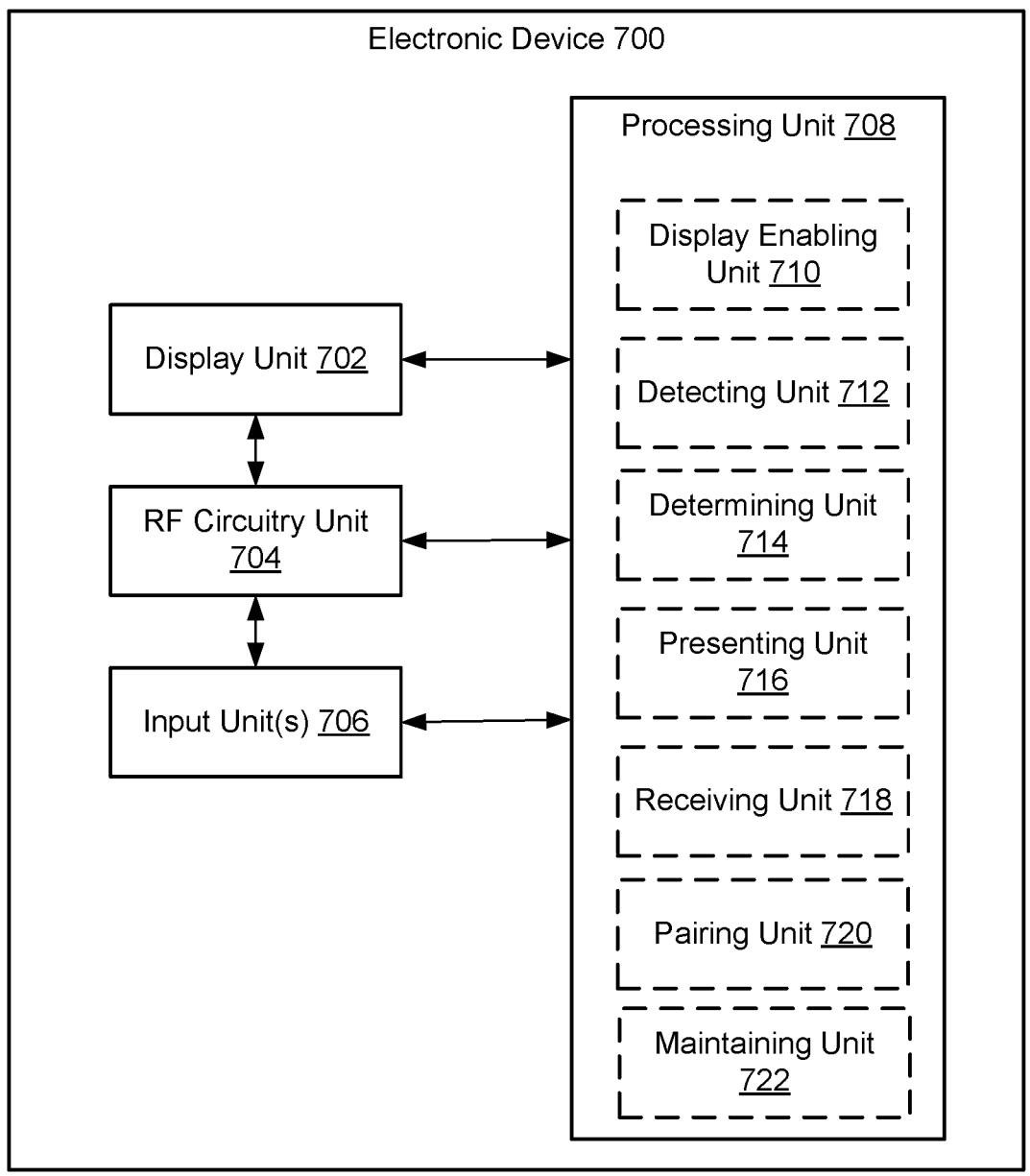
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display a user interface; an RF circuitry unit 704 for wirelessly communicating with one or more peripheral devices; one or more input device units 706 for receiving inputs from a user; and a processing unit 708 coupled to the display unit 702, the RF circuitry unit 704, and the one or more input device units 706. The processing unit 708 includes display enabling unit 710, detecting unit 712, determining unit 714, presenting unit 716, receiving unit 718, pairing unit 720, and maintaining unit 722.

The processing unit 708 is configured to: enable display of (e.g., with display enabling unit 710) a first user interface on the display unit 702. While displaying the first user interface, the processing unit 708 is configured to detect (e.g., with detecting unit 712) a pairing request to pair a first peripheral with the electronic device. In response to detecting the pairing request, the processing unit 708 is configured to determine (e.g., with determining unit 714) whether the first peripheral meets coupling criteria, wherein the coupling criteria require that the first peripheral is coupled to a second peripheral. In accordance with a determination that the first peripheral meets the coupling criteria, the processing unit 708 is configured to enable display of (e.g., with display enabling unit 710) a pairing affordance that, when activated by a user input, initiates pairing of the electronic device with the first peripheral. In accordance with a determination that the first peripheral does not meet the coupling criteria, the processing unit 708 is configured to enable display of (e.g., with display enabling unit 710) information concerning coupling of the first peripheral and the second peripheral.

In some embodiments, detecting the pairing request to pair the first peripheral with the electronic device includes detecting wireless signals transmitted from the first peripheral device and determining that the first peripheral device satisfies proximity criteria based on the detected wireless signals.

In some embodiments, the coupling criteria include a criterion that is met when the first peripheral is coupled to a third peripheral, distinct from the second peripheral.

In some embodiments, the first peripheral is one or more earbuds and the second peripheral is a case for the one or more earbuds.

In some embodiments, the coupling criteria include a criterion that is met when the one or more earbuds are at least one of: inside the case, and electrically coupled to the case.

In some embodiments, the processing unit 708 is configured to, after the electronic device is paired with the first peripheral, enable display of (e.g., with display enabling unit 710) status information concerning the first peripheral and the second peripheral in a second user interface.

In some embodiments, the processing unit 708 is configured to, after pairing of the electronic device with the first peripheral, determine (e.g., with determining unit 714) whether the second peripheral and the first peripheral are part of a predefined set of associated peripherals that have been previously paired with the electronic device. In accordance with a determination that the second peripheral and the first peripheral are part of a predefined set of associated peripherals that have been previously paired with the electronic device, the processing unit 708 is configured to enable display of (e.g., with display enabling unit 710) status information concerning the first peripheral and the second peripheral. In accordance with a determination that the second peripheral and the first peripheral are not part of a predefined set of associated peripherals that have been previously paired with the electronic device, the processing unit 708 is configured to enable display of (e.g., with display enabling unit 710) information concerning a mismatch between the first peripheral and the second peripheral.

In some embodiments, displaying information concerning the mismatch between the first peripheral and the second peripheral includes displaying a second pairing affordance that, when activated by a user input, initiates pairing of the electronic device with the second peripheral.

In some embodiments, displaying the status information concerning the first peripheral and the second peripheral includes displaying a single combined peripheral status characteristic concerning the first peripheral and the second peripheral in accordance with a determination that a difference between a first peripheral status characteristic of the first peripheral and a second peripheral status characteristic of the second peripheral is less than a predetermined threshold and the first peripheral and the second peripheral are the same type of peripheral.

In some embodiments, displaying status information concerning the first peripheral and the second peripheral includes displaying a first peripheral status characteristic concerning the first peripheral and displaying a second peripheral status characteristic concerning the second peripheral in accordance with a determination that a difference between the first peripheral status characteristic of the first peripheral and the second peripheral status characteristic of the second peripheral is greater than a predetermined threshold and the first peripheral and the second peripheral are the same type of peripheral.

In some embodiments, displaying the status information of the first peripheral includes displaying a low battery graphic in accordance with a determination that a battery level concerning the first peripheral falls below a minimum charge threshold.

In some embodiments, displaying the status information of the first peripheral includes displaying a charging battery graphic in accordance with a determination that a first peripheral is connected to a power source.

In some embodiments, the electronic device is in a locked state while displaying the first user interface, and the processing unit 708 is configured to, after activation of the pairing affordance, present (e.g., with presenting unit 716) a request for an authentication input from a user to pair the first peripheral with the electronic device; receive (e.g., with receiving unit 718) the authentication input from the user; and, in response to receiving the authentication input: pair (e.g., with pairing unit 720) the first peripheral with the electronic device; and maintain (e.g., with maintaining unit 722) the electronic device in the locked state.

In some embodiments, the processing unit 708 is configured to maintain (e.g., with maintaining unit 722) display of the first user interface associated with the locked state of the electronic device while pairing the first peripheral with the electronic device.

In some embodiments, the processing unit 708 is configured to maintain (e.g., with maintaining unit 722) display of the first user interface associated with the locked state of the electronic device after pairing the first peripheral with the electronic device is completed.

In some embodiments, the processing unit 708 is configured to, while maintaining display of the first user interface associated with the locked state of the electronic device after pairing the first peripheral with the electronic device is completed, enable display of (e.g., with display enabling unit 710) status information concerning the first peripheral.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B or FIG. 7. For example, at least some functionality described in FIGS. 6A-6C are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions which, when executed by an electronic device with a display, radio frequency (RF) circuitry for wirelessly communicating with one or more peripheral devices, and one or more input devices for receiving inputs from a user, cause the electronic device to:

display a first user interface on the display;

while displaying the first user interface, detect a pairing request to pair a first peripheral with the electronic device;

in response to detecting the pairing request:
wirelessly pair the first peripheral with the electronic device, and
after the first peripheral is paired with the electronic device, and in response to detecting the pairing request, concurrently display status information of the first peripheral and a second peripheral, wherein the first peripheral is coupled to the second peripheral, or the first peripheral and second peripheral are both coupled to a third peripheral, and further wherein the first peripheral and second peripheral are separate peripherals; and while the first peripheral and second peripheral are both coupled to the third peripheral, display a single indicator that provides status information for both the first peripheral and the second peripheral.

2. The computer readable storage medium of claim 1, wherein displaying the status information of the first peripheral and second peripheral includes concurrently displaying:
a first battery level that indicates a battery level of the first peripheral, and
a second battery level that indicates a battery level of the second peripheral.

3. The computer readable storage medium of claim 1, wherein displaying the status information of the first peripheral and second peripheral includes, in accordance with a determination that the first peripheral is connected to a power source, displaying a charging battery graphic for the first peripheral.

4. The computer readable storage medium of claim 3, wherein displaying the status information of the first peripheral and second peripheral includes, in accordance with a determination that the second peripheral is connected to a power source, displaying a charging battery graphic for the second peripheral.

5. The computer readable storage medium of claim 1, wherein displaying the status information of the first peripheral and second peripheral includes, in accordance with a determination a battery level concerning the first peripheral falls below a minimum charge threshold, displaying a low battery graphic for the first peripheral.

6. The computer readable storage medium of claim 5, wherein displaying the status information of the first peripheral and second peripheral includes, in accordance with a determination a battery level concerning the second peripheral falls below a minimum charge threshold, displaying a low battery graphic for the second peripheral.

7. The computer readable storage medium of claim 1, wherein displaying the status information concerning the first peripheral and the second peripheral includes displaying a single combined peripheral status characteristic concerning the first peripheral and the second peripheral in accordance with a determination that a difference between a first peripheral status characteristic of the first peripheral and a second peripheral status characteristic of the second peripheral is less than a predetermined threshold and the first peripheral and the second peripheral are a same type of peripheral.

8. The computer readable storage medium of claim 1, the one or more programs further comprising instructions which, when executed by the electronic device, cause the electronic device to:
while displaying the status information, concurrently display a user interface element that, when activated by a user input, ceases display of the status information and the user interface element.

9. The computer readable storage medium of claim 8, the one or more programs further comprising instructions which, when executed by the electronic device, cause the electronic device to:
cease display of the status information and the user interface element after a predetermined period of time, without detecting activation of the user interface element.

10. The computer readable storage medium of claim 1, wherein the first peripheral is a first earbud and the second peripheral is a second earbud.

11. The computer readable storage medium of claim 1, wherein the first peripheral is one or more earbuds and the second peripheral is a case for the one or more earbuds.

12. The computer readable storage medium of claim 1, wherein:
the first peripheral is a charging case for the second peripheral and the third peripheral;
the second peripheral is a first earbud; and
the third peripheral is a second earbud.

13. The computer readable storage medium of claim 1, the one or more programs further comprising instructions which, when executed by the electronic device, cause the electronic device to, in response to detecting the pairing request, wirelessly pair both the first peripheral and the second peripheral with the electronic device.

14. The computer readable storage medium of claim 1, wherein the first peripheral and second peripheral are separate peripherals that are part of a predefined set of associated peripherals that have been previously wirelessly paired with the electronic device.

15. An electronic device, comprising:
a display;
radio frequency (RF) circuitry for wirelessly communicating with one or more peripheral devices;
one or more input devices for receiving inputs from a user;
memory storing one or more programs, the one or more programs including instructions for:
displaying a first user interface on the display;
while displaying the first user interface, detecting a pairing request to pair a first peripheral with the electronic device;
in response to detecting the pairing request:
wirelessly pairing the first peripheral with the electronic device, and
after the first peripheral is paired with the electronic device, and in response to detecting the pairing request, concurrently displaying status information of the first peripheral and a second peripheral, wherein the first peripheral is coupled to the second peripheral, or the first peripheral and second peripheral are both coupled to a third peripheral, and further wherein the first peripheral and second peripheral are separate peripherals; and
while the first peripheral and second peripheral are both coupled to the third peripheral, displaying a single indicator that provides status information for both the first peripheral and the second peripheral.

16. The electronic device of claim 15, wherein displaying the status information of the first peripheral and second peripheral includes concurrently displaying:
- a first battery level that indicates a battery level of the first peripheral, and
- a second battery level that indicates a battery level of the second peripheral.

17. The electronic device of claim 15, wherein displaying the status information of the first peripheral and second peripheral includes, in accordance with a determination that the first peripheral is connected to a power source, displaying a charging battery graphic for the first peripheral.

18. The electronic device of claim 17, wherein displaying the status information of the first peripheral and second peripheral includes, in accordance with a determination that the second peripheral is connected to a power source, displaying a charging battery graphic for the second peripheral.

19. The electronic device of claim 15, wherein displaying the status information of the first peripheral and second peripheral includes, in accordance with a determination a battery level concerning the first peripheral falls below a minimum charge threshold, displaying a low battery graphic for the first peripheral.

20. The electronic device of claim 19, wherein displaying the status information of the first peripheral and second peripheral includes, in accordance with a determination a battery level concerning the second peripheral falls below a minimum charge threshold, displaying a low battery graphic for the second peripheral.

21. The electronic device of claim 15, wherein displaying the status information concerning the first peripheral and the second peripheral includes displaying a single combined peripheral status characteristic concerning the first peripheral and the second peripheral in accordance with a determination that a difference between a first peripheral status characteristic of the first peripheral and a second peripheral status characteristic of the second peripheral is less than a predetermined threshold and the first peripheral and the second peripheral are a same type of peripheral.

22. The electronic device of claim 15, wherein the one or more programs include instructions for:
- while displaying the status information, concurrently displaying a user interface element that, when activated by a user input, ceases display of the status information and the user interface element.

23. The electronic device of claim 22, wherein the one or more programs include instructions for:
- ceasing display of the status information and the user interface element after a predetermined period of time, without detecting activation of the user interface element.

24. The electronic device of claim 15, wherein the first peripheral is a first earbud and the second peripheral is a second earbud.

25. The electronic device of claim 15, wherein the first peripheral is one or more earbuds and the second peripheral is a case for the one or more earbuds.

26. The electronic device of claim 15, wherein:
- the first peripheral is a charging case for the second peripheral and the third peripheral;
- the second peripheral is a first earbud; and
- the third peripheral is a second earbud.

27. The electronic device of claim 15, wherein the one or more programs include instructions for, in response to detecting the pairing request, wirelessly pairing both the first peripheral and the second peripheral with the electronic device.

28. The electronic device of claim 15, wherein the first peripheral and second peripheral are separate peripherals that are part of a predefined set of associated peripherals that have been previously wirelessly paired with the electronic device.

29. A method, comprising:
- at an electronic device with a display, radio frequency (RF) circuitry for wirelessly communicating with one or more peripheral devices, and one or more input devices for receiving inputs from a user:
  - displaying a first user interface on the display;
  - while displaying the first user interface, detecting a pairing request to pair a first peripheral with the electronic device;
  - in response to detecting the pairing request:
    - wirelessly pairing the first peripheral with the electronic device, and
    - after the first peripheral is paired with the electronic device, and in response to detecting the pairing request, concurrently displaying status information of the first peripheral and a second peripheral, wherein the first peripheral is coupled to the second peripheral, or the first peripheral and second peripheral are both coupled to a third peripheral and further wherein the first peripheral and second peripheral are separate peripherals; and
  - while the first peripheral and second peripheral are both coupled to the third peripheral, displaying a single indicator that provides status information for both the first peripheral and the second peripheral.

30. The method of claim 29, wherein displaying the status information of the first peripheral and second peripheral includes concurrently displaying:
- a first battery level that indicates a battery level of the first peripheral, and
- a second battery level that indicates a battery level of the second peripheral.

31. The method of claim 29, wherein displaying the status information of the first peripheral and second peripheral includes, in accordance with a determination that the first peripheral is connected to a power source, displaying a charging battery graphic for the first peripheral.

32. The method of claim 31, wherein displaying the status information of the first peripheral and second peripheral includes, in accordance with a determination that the second peripheral is connected to a power source, displaying a charging battery graphic for the second peripheral.

33. The method of claim 29, wherein displaying the status information of the first peripheral and second peripheral includes, in accordance with a determination a battery level concerning the first peripheral falls below a minimum charge threshold, displaying a low battery graphic for the first peripheral.

34. The method of claim 33, wherein displaying the status information of the first peripheral and second peripheral includes, in accordance with a determination a battery level concerning the second peripheral falls below a minimum charge threshold, displaying a low battery graphic for the second peripheral.

35. The method of claim 29, wherein displaying the status information concerning the first peripheral and the second peripheral includes displaying a single combined peripheral status characteristic concerning the first peripheral and the second peripheral in accordance with a determination that a difference between a first peripheral status characteristic of the first peripheral and a second peripheral status characteristic of the second peripheral is less than a predetermined threshold and the first peripheral and the second peripheral are a same type of peripheral.

36. The method of claim 29, including:
   while displaying the status information, concurrently displaying a user interface element that, when activated by a user input, ceases display of the status information and the user interface element.

37. The method of claim 36, including:
   ceasing display of the status information and the user interface element after a predetermined period of time, without detecting activation of the user interface element.

38. The method of claim 29, wherein the first peripheral is a first earbud and the second peripheral is a second earbud.

39. The method of claim 29, wherein the first peripheral is one or more earbuds and the second peripheral is a case for the one or more earbuds.

40. The method of claim 29, wherein:
   the first peripheral is a charging case for the second peripheral and the third peripheral;
   the second peripheral is a first earbud; and
   the third peripheral is a second earbud.

41. The method of claim 29, wherein the method includes, in response to detecting the pairing request, wirelessly pairing both the first peripheral and the second peripheral with the electronic device.

42. The method of claim 29, wherein the first peripheral and second peripheral are separate peripherals that are part of a predefined set of associated peripherals that have been previously wirelessly paired with the electronic device.

* * * * *